United States Patent
Sugahara et al.

(10) Patent No.: US 8,011,746 B2
(45) Date of Patent: Sep. 6, 2011

(54) IMAGE-FORMING SYSTEM, IMAGE-FORMING APPARATUS, COMPUTER PROGRAM, AND IMAGE-FORMING METHOD

(75) Inventors: Hiroto Sugahara, Aichi-ken (JP); Hiroaki Yazawa, Nagoya (JP); Masahiro Nishizaki, Iwakura (JP); Motohiro Momozaki, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 750 days.

(21) Appl. No.: 12/005,733

(22) Filed: Dec. 28, 2007

(65) Prior Publication Data

US 2008/0174618 A1 Jul. 24, 2008

(30) Foreign Application Priority Data

Dec. 28, 2006 (JP) .................. 2006-355668

(51) Int. Cl.
*B41J 29/38* (2006.01)
*G06F 17/60* (2006.01)
(52) U.S. Cl. .............. 347/5; 347/19; 705/77; 705/14.14
(58) Field of Classification Search .............. 705/14, 705/1, 77, 14.14, 14.36; 347/5, 9, 19, 86
See application file for complete search history.

(56) References Cited

U.S. PATENT DOCUMENTS

| | | |
|---|---|---|
| 2001/0016912 A1 | 8/2001 | Takahashi |
| 2002/0022990 A1* | 2/2002 | Kurata et al. .................. 705/14 |
| 2002/0036668 A1 | 3/2002 | Matsumoto et al. |
| 2006/0045595 A1 | 3/2006 | Hanaoka |
| 2006/0095280 A1* | 5/2006 | Gooding .......................... 705/1 |

FOREIGN PATENT DOCUMENTS

| | | |
|---|---|---|
| JP | 2000-343721 | 12/2000 |
| JP | 2002072795 | 3/2002 |
| JP | 2002-127550 | 5/2002 |
| JP | 2002-167530 | 6/2002 |
| JP | 2002167530 | 6/2002 |
| JP | 2002-240400 | 8/2002 |
| JP | 2002-331728 | 11/2002 |
| JP | 2003-320658 | 11/2003 |
| JP | 2004-013715 | 1/2004 |
| JP | 2004-090517 | 3/2004 |
| JP | 2004-188795 | 7/2004 |
| JP | 2004-331832 | 11/2004 |
| JP | 2005028820 | 2/2005 |
| JP | 2005-067045 | 3/2005 |
| JP | 2005-181855 | 7/2005 |
| WO | WO 01/17784 | 3/2001 |

* cited by examiner

*Primary Examiner* — Lam S Nguyen
(74) *Attorney, Agent, or Firm* — Frommer Lawrence & Haug LLP

(57) ABSTRACT

When a DNA ink printing mode is selected, a serial number and a pattern data of DNA is read from an IC tag of a DNA ink cartridge and a fingerprint of a printing person is read by a fingerprint authenticating unit. The pattern of the fingerprint and DNA which have been read are verified with the pattern data of fingerprints and DNA in a memory and personal authentication is carried out. Thereafter, a DNA ink is jetted on to a recording paper, and printing of an image by an image forming ink is carried out. By carrying out printing by such a method, it is possible to specify the printing person who has created the printed matter.

24 Claims, 24 Drawing Sheets

Fig. 5

| SERIAL NUMBER | DNA PATTERN DATA | FINGERPRINT PATTERN DATA | END FLAG |
|---|---|---|---|
| 00001000 | @＊あ5＆！！… | ＋p～￥！？＞… | |
| 00001001 | …… | …… | ✓ |
| 00001002 | …… | …… | |
| ⋮ | ⋮ | ⋮ | |

Fig. 7A

| SERIAL NUMBER | GROUP CODE | FINGERPRINT PATTERN DATA | END FLAG |
|---|---|---|---|
| 00001000 | 120543 (PERSONNEL DEPARTMENT) | ＋p～￥！？＞… | |
| 00001001 | 126358 (MANAGER) | …… | ✓ |
| 00001002 | …… | …… | |
| ⋮ | ⋮ | | |

Fig. 7B

| GROUP CODE | 120543 | 126358 | … |
|---|---|---|---|
| PATTERN DATA OF DNA CORRESPONDING TO GROUP CODE | ＠＊あ5＆！！… | ！？＜％＊R」 | |
| | ？＝＃％＊7￥ | ＠＊あ5＆！！ | |
| | …… | …… | |
| | ⋮ | ⋮ | |

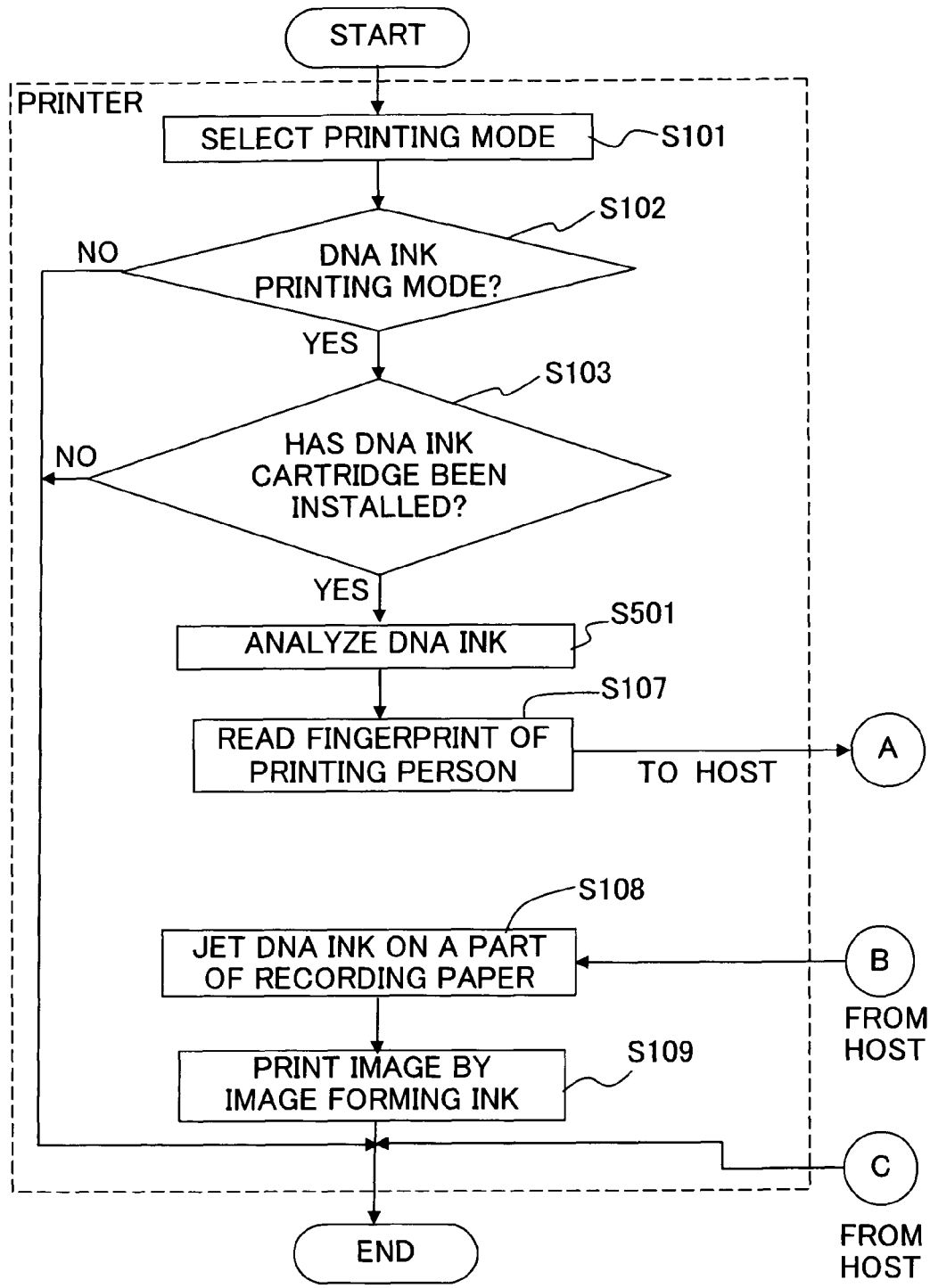

IMAGE-FORMING SYSTEM, IMAGE-FORMING APPARATUS, COMPUTER PROGRAM, AND IMAGE-FORMING METHOD

CROSS-REFERENCE TO RELATED APPLICATION

The present application claims priority from Japanese Patent Application No. 2006-355668, filed on Dec. 28, 2006, the disclosure of which is incorporated herein by reference in its entirety.

BACKGROUND OF THE INVENTION

1. Field of the Invention

The present invention relates to an image forming system and an image forming apparatus which record an image on a recording medium, a computer program which operates the image forming system and the image forming apparatus, and an image forming method.

2. Description of the Related Art

In image forming apparatuses which record an image on a recording medium such as a recording paper, there are apparatuses which make adhere an identifiable ink such as an ink containing DNA to the recording medium. For example, in an image forming apparatus described in Japanese Patent Application Laid-open No. 2002-72795, an image is printed on a paper by adhering a developer to the paper, and the DNA ink is adhered to a paper by an ink stamp. Accordingly, it is possible to judge an authenticity of a recorded material by carrying out an analysis by collecting the DNA ink on the recorded material.

SUMMARY OF THE INVENTION

However, in the image forming apparatus described in Japanese Patent Application Laid-open No. 2002-72795, there is a possibility that a person other than a person corresponding to DNA which is contained in the DNA ink would carry out printing by using that DNA ink. Therefore, even when the DNA ink is adhered to the recorded material, it is not possible to specify a person assuredly who has performed printing on the recorded material.

An object of the present invention is to provide an image forming system and an image-forming apparatus which are capable of specifying assuredly a person who has carried out printing (hereinafter, called as 'printing person'), and a computer program which operates the image forming system and the image-forming apparatus. Moreover, another object of the present invention is to provide an image-forming method which is capable of specifying assuredly the printing person.

According to a first aspect of the present invention, there is provided an image-forming system via which a predetermined printing person causes an image to be formed on a recording medium, the image forming system comprising:

a cartridge-installation section in which an ink cartridge, filled with an identifiable ink having a predetermined identifiable attribute is installed;

an ink jetting mechanism which jets, on to the recording medium, the identifiable ink supplied from the ink cartridge installed in the cartridge-installation section;

a first-information acquiring mechanism which acquires, from one of the ink cartridge installed in the cartridge-installation section and the identifiable ink filled in the ink cartridge, a first information indicating the attribute of the identifiable ink;

a second-information acquiring mechanism which acquires, from the printing person, a second information specifying the printing person;

a judging mechanism which verifies the first and the second information acquired by the first-information acquiring mechanism and the second-information acquiring mechanism, respectively, to judge an allowability of printing to be carried out with the identifiable ink; and an inhibiting mechanism which inhibits the ink jetting mechanism from jetting the identifiable ink when the judging mechanism judges not to allow the printing with the identifiable ink.

Accordingly, since the judgment of whether or not the printing is to be carried out with the identifiable ink is made based on attribute information (the first information) of the identifiable ink filled in the ink cartridge (ink cartridge for identifying) installed in the cartridge installing section, and printing-person specifying information (the second information) of the printing person, it is possible to prevent unauthorized printing which is carried out by using the identifiable ink. Consequently, it is possible to specify assuredly the printing person of a printed matter based on the identifiable ink adhered to the printed matter.

The image-forming system of the present invention may further include a first memory which stores so as to associate mutually corresponding first and second information among the first and the second information. The judging mechanism may verify the first information of the identifiable ink acquired by the first-information acquiring mechanism and the first information stored in the first memory, and may further verify the second information acquired by the second-information acquiring mechanism and the second information stored in the first memory, and may judge the allowability of the printing to be carried out with the identifiable ink. In this case, each of the first information (attribute information) acquired by the first-information acquiring mechanism (attribute-information acquiring mechanism), the second information (printing-person specifying information) acquired by the second-information acquiring mechanism (printing-person specifying information acquiring mechanism), and the attribute information and the printing-person specifying information stored in the first memory are verified (collated), and the judgment of whether or not the printing is to be carried out by using the identifiable ink is made. Therefore, the attribute information and the printing-person specifying information can be let to be different (such as pattern data of DNA and pattern data of fingerprints), and a reliability of security is improved.

In the image forming system of the present invention, the first information may be assigned to correspond to the second information of the printing person who is indicated by the first information as authorized to carry out the printing with the identifiable ink, and the judging mechanism may judge that the printing is to be carried out with the identifiable ink only when the first information acquired by the first-information acquiring mechanism corresponds to the second information. In this case, the attribute information is assigned to correspond to printing-person identifying information of the printing person who is authorized to use the identifiable ink indicating that attribute information. Therefore, it is possible to verify directly the attribute information acquired by the attribute-information acquiring mechanism and the printing-person specifying information acquired by the printing-person specifying information acquiring mechanism, and to make a judgment of whether or not the printing is to be carried out with the identifiable ink. Consequently, it is possible to make promptly the judgment of whether or not the printing is to be carried out with the identifiable ink.

In the image forming system of the present invention, the ink cartridge may have a first-information retention mechanism which retains the first information corresponding to the identifiable ink filled in the ink cartridge; and the first-information acquiring mechanism may acquire the first information from the first-information retention mechanism. In this case, since the first-information acquiring mechanism is capable of acquiring the first information from the first-information retention mechanism, acquiring of the attribute information becomes easy.

In the image forming system of the present invention, the first-information acquiring mechanism may analyze the identifiable ink filled in the ink cartridge installed in the cartridge-installation section, to acquire ink identification information. In this case, since the ink identification information is acquired by analyzing the identifiable ink filled in the ink cartridge which has been installed in the cartridge installing section, it is possible to prevent printing carried out by using an unauthorized ink, in a case such as when another identifiable ink is filled in the ink cartridge and the printing is carried out by using that identifiable ink without being noticed by the printing person.

The image forming system of the present invention may further include a second memory which stores disable information which indicates as to whether or not use of the ink cartridge is inhibited irrespective of the printing person, and the judging mechanism may judge the allowability of the printing to be carried out with the identifiable ink, based on the disable information stored in the second memory. In this case, since the printing using the identifiable ink is not carried out when the ink cartridge of which the use is inhibited has been installed in the cartridge installing section, printing by using the unauthorized identifiable ink is prevented, and the reliability of security is improved. One memory may serve as both the first memory and the second memory, and the disable information (use-inhibiting information), the printing-person specifying information, and the attribute information mutually corresponding to this memory may be associated and stored.

In the image forming system of the present invention, the ink cartridge may have a cartridge-ID information retention mechanism which retains a cartridge-ID information assigned uniquely to the ink cartridge, and the image forming system may further includes:

a cartridge-ID information acquiring mechanism which acquires the cartridge-ID information from the cartridge-ID information retention mechanism of the ink cartridge installed in the cartridge-installation section, and the disable information stored in the second memory may be information indicating the cartridge ID of the ink cartridge which is disabled, and the judging mechanism may judge that the printing with the identifiable ink is disabled when the cartridge-ID information acquired by the cartridge-ID information acquiring mechanism matches with the cartridge-ID information which corresponds to the disable information stored in the second memory. In this case, since the printing using the identifiable ink is not carried out when the cartridge-ID information of the cartridge installed in the cartridge installing section has coincided (matched) with any one of the cartridge-ID information of the ink cartridge which is disabled, stored in the second memory, it is possible to prevent the printing by using the unauthorized identifiable ink.

In the image forming system of the present invention, the ink cartridge may have a cartridge-ID information retention mechanism which retains cartridge-ID information which is assigned uniquely to the ink cartridge; and the image forming system may further includes:

a cartridge-ID information acquiring mechanism which acquires the cartridge-ID information from the cartridge-ID information retention mechanism of the ink cartridge installed in the cartridge-installation section, and the disable information stored in the second memory may indicate the cartridge-ID information of the ink cartridge of which use is authorized, and the judging mechanism may judge that the printing with the identifiable ink is enable only when the cartridge-ID information acquired by the cartridge-ID information acquiring mechanism matches with the cartridge-ID information which corresponds to the disable information stored in the second memory.

In this case, since it is possible to carry out the printing using the identifiable ink only when the cartridge-ID information of the identifiable ink cartridge installed in the cartridge installing section with any of the cartridge-ID information of the cartridge which is authorized to be used, stored in the second memory, it is possible to prevent to carry out the printing in which the unauthorized identifiable ink is used.

The image forming system of the present invention may further include an ink-shortage detecting mechanism which detects a shortage of the ink in the ink cartridge installed in the cartridge-installation section; and an updating mechanism which updates the disable information stored in the second memory to information which indicates that use of the ink cartridge, installed in the ink cartridge-installation section, is inhibited irrespective of the printing person when the ink-shortage detecting mechanism detects the shortage of the ink. In this case, since the ink cartridge of which the ink has been exhausted once cannot be used, it is possible to prevent assuredly an unauthorized use of the ink cartridge having the ink-shortage, such as a printing person making a printed matter using other identifiable ink by filling the other identifiable ink in the ink cartridge having the ink-shortage, by a third person having a wrong intention.

In the image forming system of the present invention, the ink cartridge may have a disable information retention mechanism which retains a disable information which indicates use of the ink cartridge is inhibited irrespective of the printing person, and the image forming system may further include:

a disable-information acquiring mechanism which acquires the disable information from the disable information retention mechanism of the identifiable ink cartridge installed in the cartridge-installation section, and the judging mechanism may judge the allowability of the printing with the identifiable ink, based on the disable information acquired by the disable-information acquiring mechanism. In this case, since the printing in which the identifiable ink used is not carried out when the ink cartridge of which the use is inhibited is installed in the cartridge installing section, it is possible to prevent carrying out the printing in which an unauthorized identifiable ink is used.

The image forming system of the present invention may further include an ink-shortage detecting mechanism which detects a shortage of the ink in the ink cartridge installed in the cartridge-installation section; and an information updating mechanism which updates the disable information retained by the disable-information retention mechanism of the ink cartridge installed in the cartridge-installation section to information which indicates that use of the ink cartridge installed in the ink cartridge-installation section is inhibited irrespective of the printing person, when the ink-shortage detecting mechanism detects the shortage of the ink. In this case, since the ink cartridge (ink cartridge for identifying) of which the ink has been exhausted once cannot be used, it is possible to prevent assuredly an unauthorized use of the ink cartridge having the ink-shortage, such as a printing person making a printed matter using other identifiable ink by filling the other identifiable ink in the ink cartridge having the ink-shortage, by a third person having a wrong intention.

The image forming system of the present invention may further include another ink jetting mechanism which jets on to a recording medium an image-forming ink to form an image on the recording medium, the image-forming ink being different from the identifiable ink, and upon performing printing with the identifiable ink, the identifiable ink may be jetted to a portion of the recording medium by the ink jetting mechanism, and the image-forming ink is jetted to the recording medium by the another ink jetting mechanism. In this case, at the time of jetting, since the identifiable ink is jetted on to only a part (a portion) of the recording medium, it is possible to save an amount of the identifiable ink to be used. Moreover, it is possible to carry out printing of a color other than the identifiable ink.

At this time, the identifiable ink may be a colorless ink. In this case, it is possible to make a recording medium on which the printing is carried out, to be a recording medium for which it is not possible to distinguish easily at a glance whether or not the identifiable ink has been jetted.

In the image forming system of the present invention, the identifiable ink may be an ink which is selected from a group of inks consisting of a DNA ink, an ink which contains a fluorescent material, an ink which contains a magnetic material, an ink which contains a radioactive isotope, and an ink which contains stress luminescent particles. Or, the image forming ink may include inks of cyan, magenta, yellow, and black inks, and the identifiable ink may be a special color ink. In any of these cases, it is possible to identify easily and assuredly the identifiable ink.

In the image forming system of the present invention, the image-forming system may perform the printing by jetting the ink only from the another ink jetting mechanism when the ink cartridge is not installed in the cartridge-installation section. In this case, when the ink cartridge in which the identifiable ink is filled has not been installed, it is possible to carry out printing in which only the image-forming ink is used.

The image forming system of the present invention may further include a selecting mechanism via which the printing person selects one of an identifiable-ink printing mode of performing printing with the identifiable ink, and a normal printing mode of performing printing with only the image-forming ink, and the image-forming system may perform the printing by jetting the identifiable ink from the ink jetting mechanism, and by jetting the image-forming ink from the another ink jetting mechanism, when the judging mechanism judges that printing is to be carried out with the identifiable ink and when the printing person selects the identifiable-ink printing mode via the selecting mechanism; and the image-forming system may perform the printing by jetting the image forming ink only from the another ink jetting mechanism when the printing person selects the normal printing mode via the selecting mechanism.

In this case, since it is possible to select as to whether or not the printing is to be carried out by jetting the identifiable ink even when the ink cartridge having the identifiable ink filled has not been installed, it is possible to carry out printing in which an identifiable ink such as the DNA ink is used, only when necessary, and to suppress a wasteful consumption of the identifiable ink. Moreover, when the same printing person carries out continuously (in succession) the printing in which the identifiable ink is used and the printing in which only the image-forming ink is used, it is not necessary to remove and insert every time the ink cartridge filled with the identifiable ink.

According to a second aspect of the present invention, there is provided an image-forming apparatus which is communicably connected to a judging device, and via which a predetermined printing person causes an image to be formed on a recording medium, the apparatus including:

a cartridge-installation section in which an ink cartridge, filled with an identifiable ink having a predetermined identifiable attribute, is installed;

an ink jetting mechanism which jets, onto the recording medium, the identifiable ink which is supplied from the ink cartridge installed in the cartridge-installation section;

a first-information acquiring mechanism which acquires, from one of the ink cartridge installed in the cartridge-installation section and the identifiable ink filled in the ink cartridge, a first information indicating an attribute of the identifiable ink;

a second-information acquiring mechanism which acquires, from the printing person, a second information specifying a printing person;

a communication mechanism which transmits the second information and the first information to the judging device, and receives a judgment result of an allowability of the printing with the identifiable ink, which is judged based on the second information and the first information by the judging unit; and an inhibiting mechanism which inhibits the ink jetting mechanism from jetting the identifiable ink, when the judgment result received by the communication mechanism is a judgment not to allow the printing with the identifiable ink.

According to the second aspect of the present invention, since the judging unit is provided independently of the image forming apparatus, by providing one judging unit for a plurality of image forming apparatuses for example, it is possible to make integrally (uniformly) a judgment for the plurality of image forming apparatuses. Moreover, since the judging unit and the image forming apparatus are provided communicably, it is possible to arrange the two distantly.

According to a third aspect of the present invention, there is provided an image-forming apparatus via which a predetermined printing person causes an image to be formed on a recording medium, including:

a cartridge-installation section in which an ink cartridge, filled with an identifiable ink having a predetermined identifiable attribute, is installed;

an ink jetting mechanism which jets, onto the recording medium, the identifiable ink which is supplied from the ink cartridge installed in the cartridge-installation section;

a first-information acquiring mechanism which acquires, from the ink cartridge installed in the cartridge-installation section and the identifiable ink filled in the cartridge, a first information indicating the attribute of the identifiable ink;

a second-information acquiring mechanism which acquires a second information specifying a printing person;

a judging mechanism which judges an allowability of a printing with the identifiable ink, based on the first information acquired by the first-information acquiring mechanism and the second information acquired by the second-information acquiring mechanism;

an inhibiting mechanism which inhibits the ink jetting mechanism from jetting the identifiable ink when the judging mechanism judges not to allow the printing with the identifiable ink; and a body which accommodates the cartridge-installation section, the ink jetting mechanism, the first-information acquiring mechanism, the second-information acquiring mechanism, the judging mechanism, and the inhibiting mechanism.

According to the third aspect of the present invention, since the judging unit is provided integrally, it is possible use the image forming apparatus singly. Therefore, a portable image forming apparatus may be provided.

According to a fourth aspect of the present invention, there may be provided a computer program operating an image forming-system via which a predetermined printing person causes an image to be formed on a recording medium, the image-forming system having: a cartridge-installation section in which an ink cartridge filled with an identifiable ink having a predetermined identifiable attribute, is installed; an ink jetting mechanism which jets, onto the recording medium, the identifiable ink which is supplied from the ink cartridge installed in the cartridge-installation section; a first-information acquiring mechanism which acquires, from the ink cartridge installed in the cartridge-installation section and the identifiable ink filled in the cartridge, a first information indicating the attribute of the identifiable ink; and a second-information acquiring mechanism which acquires, from the printing person, second information specifying the printing person, wherein the computer program causes a computer to perform:

judging an allowability of printing with the identifiable ink, based on the first information acquired by the first-information acquiring mechanism and the second-information acquired by the second-information acquiring mechanism; and inhibiting the ink jetting mechanism from jetting the identifiable ink when a judgment is made not to allow the printing with the identifiable ink.

According to a fifth aspect of the present invention, there is provided a computer program which operates an image-forming apparatus communicably connectable to a judging unit, and via which a predetermined printing person causes an image to be formed on a recording medium, the image-forming apparatus having: a cartridge-installation section in which an ink cartridge, filled with an identifiable ink having a predetermined identifiable attribute, is installed; an ink jetting mechanism which jets, onto the recording medium, the identifiable ink which is supplied from the ink cartridge installed in the cartridge-installation section; a first-information acquiring mechanism which acquires, from the ink cartridge installed in the cartridge-installation section and the identifiable ink filled in the cartridge, a first information indicating the attribute of the identifiable ink; and a second-information acquiring mechanism which acquires a second information specifying the printing person, and the computer program causes a computer to perform:

transmitting, to the judging unit, the first information acquired by the first-information acquiring mechanism and the second information acquired by the second-information acquiring mechanism;

receiving a judgment result of the judgment of an allowability of a printing with the identifiable ink, based on the information specifying the printing person and the first information; and inhibiting the ink jetting mechanism from jetting the identifiable ink when the judgment result is made not to allow the printing with the identifiable ink.

According to a sixth aspect of the present invention, there is provided a computer program which operates an image-forming apparatus via which a predetermined printing person causes an image to be formed on a recording medium, the image forming apparatus having: a cartridge-installation section in which an ink cartridge, filled with an identifiable ink having a predetermined identifiable attribute, is installed; an ink jetting mechanism which jets, onto the recording medium, the identifiable ink supplied from the ink cartridge installed in the cartridge-installation section; a first-information acquiring mechanism which acquires, from the ink cartridge installed in the cartridge-installation section and the identifiable ink filled in the cartridge, a first information indicating the attribute of the identifiable ink; and a second-information acquiring mechanism which acquires second information specifying the printing person;

and the computer program causes a computer to perform:

judging an allowability of a printing with the identifiable ink, based on the first information acquired by the first-information acquiring mechanism and the second information acquired by the second-information acquiring mechanism; and inhibiting the ink jetting mechanism from jetting the identifiable ink when a judgment is made not to allow the printing with the identifiable ink.

According to a seventh aspect of the present invention, there is provided an image-forming method via which a predetermined printing person causes an image to be formed on a recording medium, including:

providing an ink cartridge in which an identifiable ink having a predetermined attribute is filled;

acquiring, from one of the ink cartridge installed in the cartridge-installation section and the identifiable ink filled in the ink cartridge, information indicating the attribute of the identifiable ink;

acquiring, from the printing person, information which specifies the printing person;

verifying the information indicating the attribute of the identifiable ink and the information indicating the printing person to authenticate the printing person; and inhibiting the ink jetting mechanism from jetting the identifiable ink when a judgment is made not to allow the printing with the identifiable ink when the printing person is not authenticated or allowing the ink jetting mechanism to jet the identifiable ink only when the printing person is authenticated.

In the image-forming method of the present invention, the verification of the information indicating the attribute of the identifiable ink and the information indicating the printing person may be performed based on a table correlating the information

BRIEF DESCRIPTION OF THE DRAWINGS

FIG. 5 is a diagram showing data which is stored in a data storage section in FIG. 4;

FIG. 7A and FIG. 7B are diagrams showing data which are stored in a data storage section in a first modified embodiment;

FIGS. 11A and 11B are flowcharts corresponding to FIGS. 6A and 6B, of the third modified embodiment;

DETAILED DESCRIPTION OF THE PREFERRED EMBODIMENTS

Exemplary embodiments of the present invention will be described below.

Figure 1:
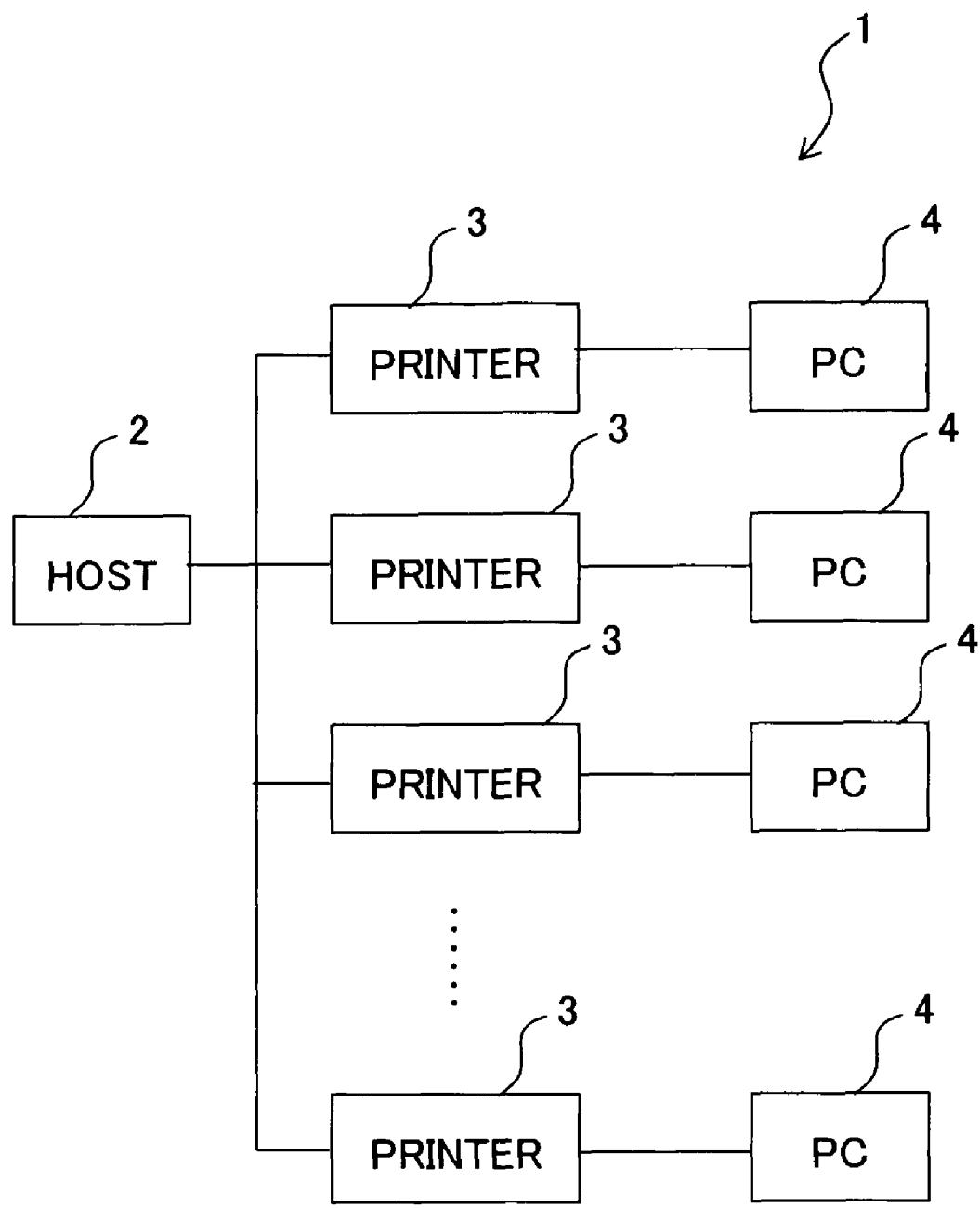
FIG. 1 is a schematic block diagram of an image forming system according to an embodiment of the present invention.

FIG. 1 is a diagram showing a structure of an image forming system according to an embodiment of the present invention. As it is shown in FIG. 1, in an image forming system 1, a plurality of printers 3 (image-forming apparatuses) is communicably connected to one host 2 (judging unit). Each of the printers 3 is connected to a PC 4 which transmits to the printer 3 an image data for printing and a signal for selecting a printing mode which will be described later. In FIG. 1, one PC 4 is connected to one printer 3. However, one PC 4 may be connected to a plurality of printers 3.

Figure 2:
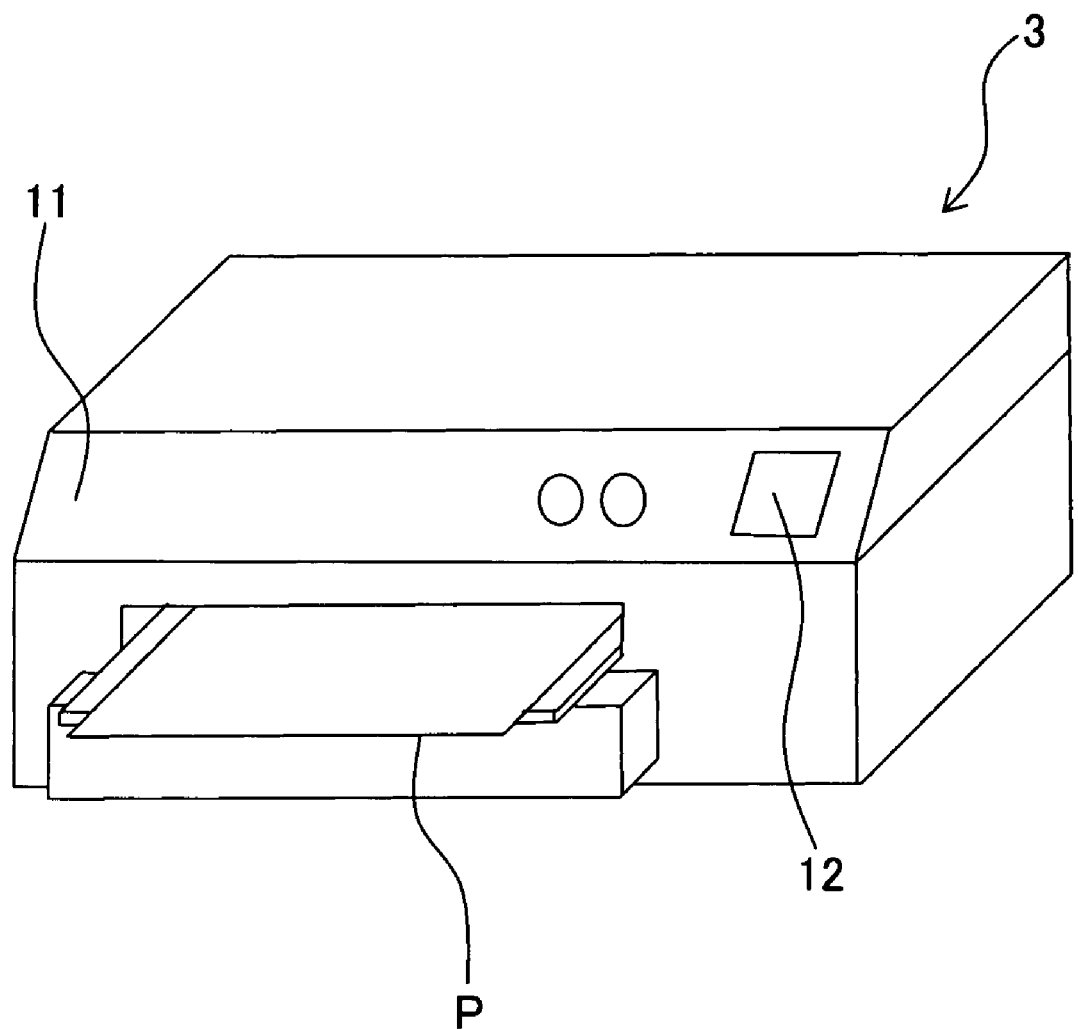
FIG. 2 is a schematic perspective view of a printer in FIG. 1.
Figure 3:
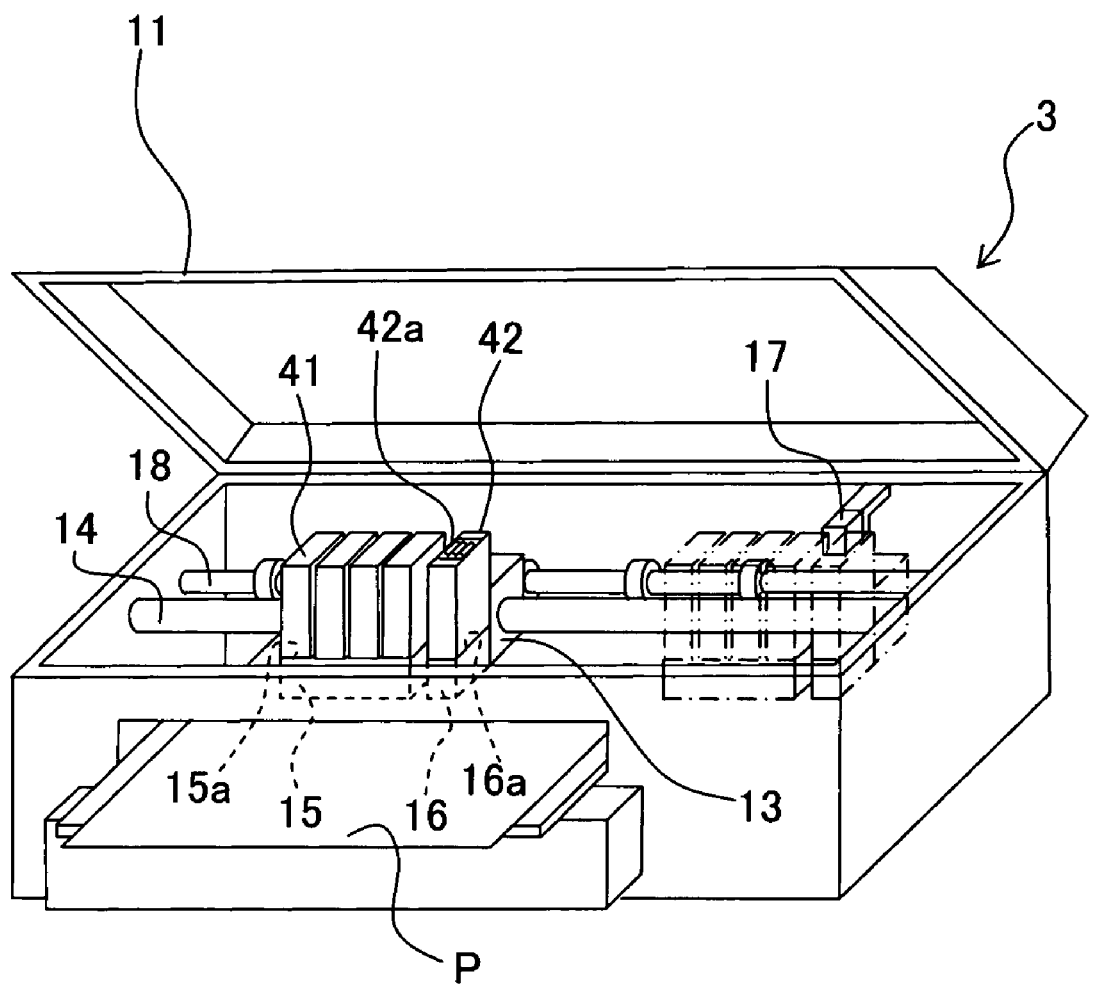
FIG. 3 is a diagram showing a state with an open lid (cover) in FIG. 2.
Figure 4A:
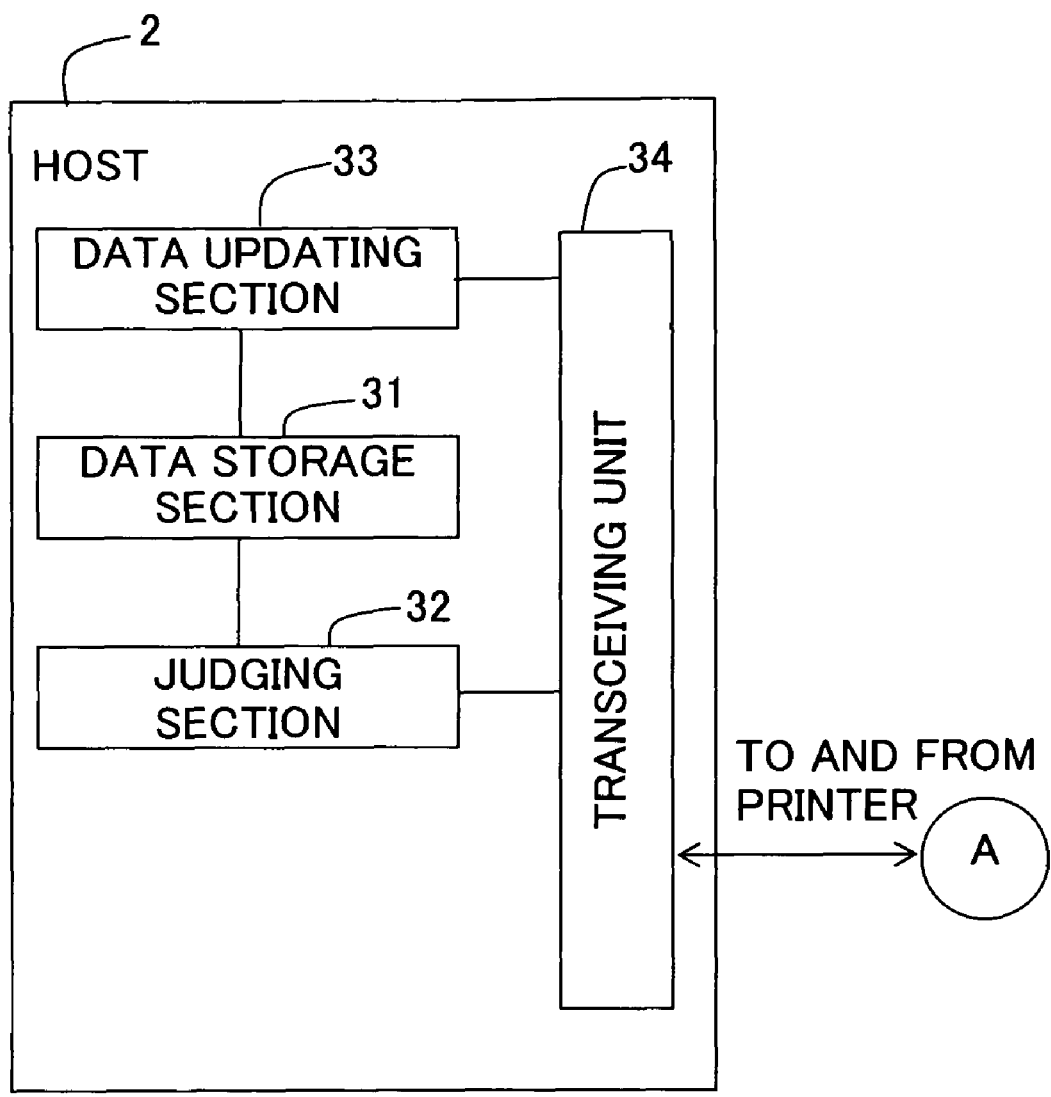
FIGS. 4A and 4B are block diagrams showing a structure of the printer and a host in FIG. 1.
Figure 4B:
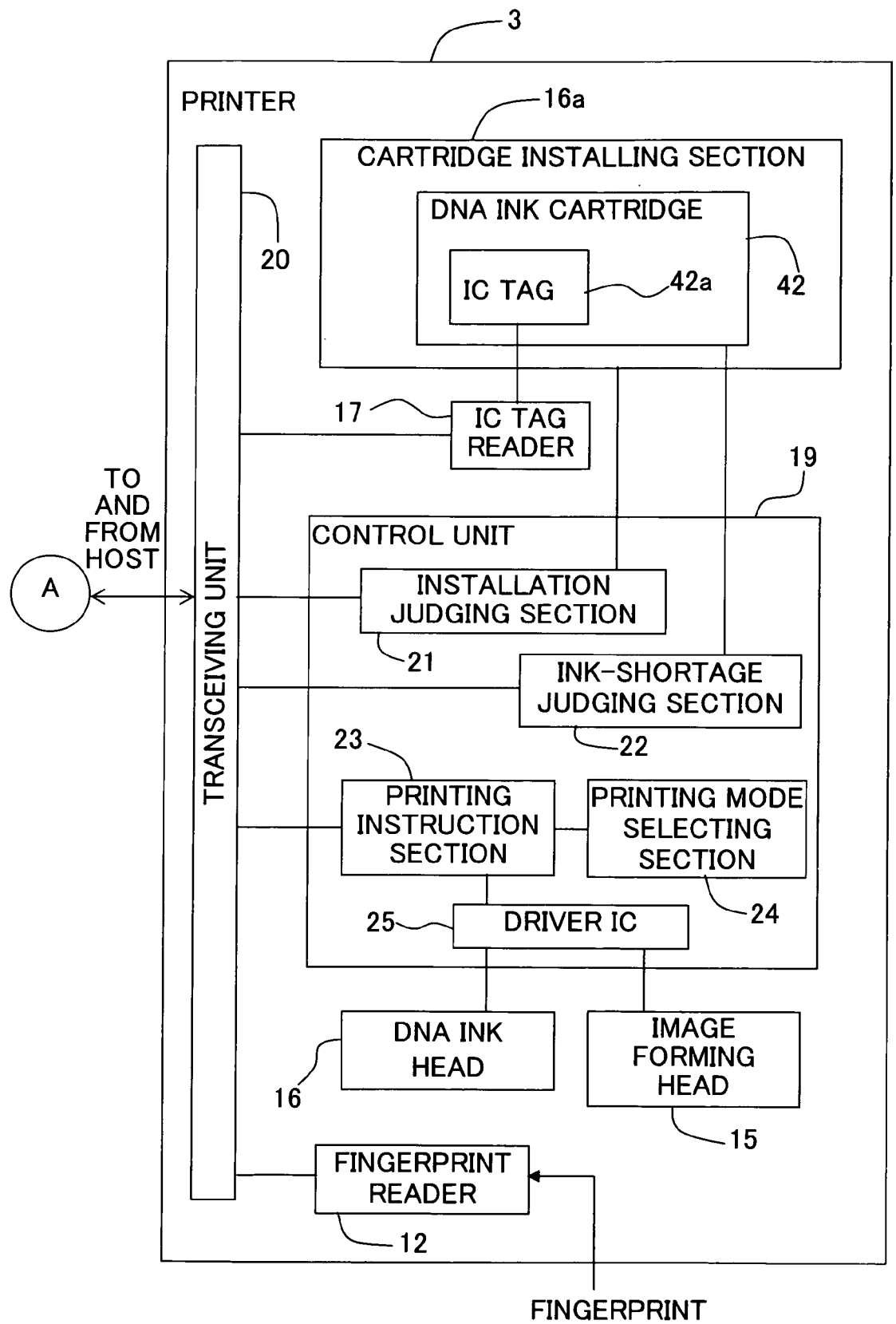

Next, the host 2 and the printer 3 will be described below in detail. FIG. 2 is a schematic diagram showing an appearance of the printer 3 in FIG. 1. FIG. 3 is a diagram when a cover of the printer 3 in FIG. 2 is opened. FIG. 4 is a block diagram in which connections of the host 2 and the printer 3 are shown in detail. Moreover, in FIG. 4, a DNA ink head 16 and a DNA ink cartridge installing section 16a, which are integrated in FIG. 3 for simplifying the diagram, are shown to be mutually separated.

A structure of the printer 3 will be described below. As shown in FIGS. 2 to 4, the printer 3 includes a lid (cover) 11, a fingerprint reader 12 (printing-person specifying information (printing person ID) acquiring mechanism, a second-information acquiring mechanism), a carriage 13, an image forming head 15 (image-forming ink jetting mechanism), the DNA ink head 16 (identifiable-ink jetting mechanism), an IC tag reader 17 (attribute-information acquiring mechanism, cartridge-ID information acquiring mechanism, and first-information acquiring mechanism), paper transporting rollers 18, a control unit 19, and a transceiving unit (transmitting and receiving unit) 20.

The lid 11 is provided on an upper portion of the printer 3. A printing person opens the lid 11 and installs an image forming ink cartridge 41 in a cartridge installing section 15a of the image forming head 15 which will be described later, and installs a DNA ink cartridge 42 (identifiable-ink cartridge) in the cartridge installing section 16a of the DNA ink head 16.

The fingerprint reader 12 is provided at a right-end portion in a front-surface of the lid 11. The fingerprint reader 12 reads pattern data of fingerprints (printing person specifying information, printing-person ID, second information) when the printing person has touched his finger to the fingerprint reader 12. The carriage 13 reciprocates in a left-right (horizontal) direction in FIG. 2 along a guide 14 which is extended in the left-right direction in FIG. 2. In the following description, the left-right direction, a front side and a back side are defined as the left-right direction, the front side, and a back side in FIG. 2, respectively.

The image forming head 15 is arranged on a front face of the carriage 13 and an upper surface thereof is the cartridge installing section 15a in which four image forming ink cartridges 41 are installed. Inks of black, yellow, cyan, and magenta color respectively are filled in the four image forming ink cartridges 41. The image forming head 15 jets the inks of four colors, supplied by the four image forming ink cartridges 41, from nozzles formed in a lower surface thereof which are not shown in the diagram, while reciprocating in the left-right direction along with the carriage 13.

The DNA ink head 16 is provided at a right side of the image forming head 15, of the front face of the carriage 13, and an upper surface thereof is the cartridge installing section 16a in which a DNA ink cartridge 42 is installed. A colorless transparent DNA ink (identifiable ink) including DNA of the printing person who uses the DNA ink cartridge 42 is filled in the DNA ink cartridge 42. Moreover, the DNA ink head 16 jets the DNA ink, which is supplied from the DNA ink cartridge 42, from nozzles formed in a lower surface thereof which are not shown in the diagram, while reciprocating in the left-right direction along with the carriage 13.

The transporting rollers 18 transport a recording paper P in a front direction (paper transporting direction). The printing is carried out on the recording paper P by jetting the inks of four colors by the image forming head 15, on to the recording paper which is transported by the paper transporting rollers 18. Moreover, the DNA ink is adhered to the recording paper P by jetting the DNA ink from the DNA ink head 16 on a portion of the recording paper P which is transported by the paper transporting roller 18. Accordingly, it is possible to specify a person who has made a printed matter by analyzing the DNA ink which is adhered to the recording paper P. Here, since the DNA ink is colorless and transparent, it is not possible to distinguish by having a glance at the printed matter, whether or not the DNA ink is adhered to the recording paper P. Moreover, since the DNA ink is jetted on to only a part of the recording paper P, it is possible to save the DNA ink.

The IC tag reader 17 is arranged near a right-end portion of the printer 3. Here, the DNA ink cartridge 42 has an IC tag 42a (attribute-information retention mechanism, cartridge-ID information retention mechanism) at an upper surface thereof. The IC tag 42a keeps a record of a serial number (cartridge ID information) assigned inherently to each DNA ink cartridge 42 and pattern data (attribute information, first information) of DNA included in the DNA ink which is filled in the DNA ink cartridge 42. When the DNA ink cartridge 42 is installed in the cartridge installing section 16a, the IC tag 42a and the IC tag reader 17 are brought face to face by moving the carriage 13 in left-right direction. Further, the IC tag reader 17 reads the pattern data of the DNA and the serial number from the IC tag 42a. In this manner, since the DNA ink cartridge 42 has the IC tag 42a having the pattern data of the DNA ink and the serial number recorded therein, it is possible to acquire easily the pattern data of the DNA and the serial number of the DNA ink cartridge 42 by the IC tag reader 17.

The control unit 19 has an installation judging section 21, an ink-shortage judging section (exhausted-ink judging section) 22, a printing instruction section 23, a printing mode selecting section 24, and a driver IC 25. The installation judging section 21 makes a judgment of whether or not the DNA ink cartridge 42 has been installed in the cartridge installing section 16a. The ink-shortage judging section 22 makes a judgment of whether or not the ink in the DNA ink cartridge 42 installed in the cartridge installing section 16a has been exhausted. The printing instruction section 23 gives printing instructions to the driver IC 25 based on the printing mode which has been selected by the printing-mode selecting section 24 and a judgment result in the host 2. The printing-mode selecting section 24 selects one of the printing modes from a DNA-ink printing mode in which the printing is carried out by using both the DNA ink and the image forming ink, and a normal printing mode in which the printing is carried out by using only the image forming ink. The driver IC 25 controls an operation of the image forming head 15 and the DNA ink head 16, based on the instructions from the printing instruction section 23.

The transceiving unit 20 is connected to a transceiving unit 36 of the host 2. Accordingly, communication is carried out between the host 2 and the printer 3.

Next, the host 2 will be described below. The host 2 has a data storage section 31, a judging section 32, a data updating section 33, and a transceiving unit 34. The data storage section 31 serves as both a first memory and a second memory.

Serial numbers of the DNA ink cartridges 42, pattern data of the DNA included in the DNA ink filled in the DNA ink cartridge 42 which corresponds to the serial number, pattern data of fingerprint of the printing person who uses the DNA ink cartridge 42, and end flags (unable information (use-inhibiting information) are stored upon associating in the data storage section 31 as shown in FIG. 5. Here, the DNA pattern data is data which is obtained by analyzing the DNA ink filled in the DNA ink cartridge 42 which has been registered in advance. The pattern data of fingerprints is data which is obtained from fingerprint of a printing person who has been authorized to use the DNA ink cartridge 42 which has been registered in advance. The end flag is a flag which indicates whether or not the use of the DNA ink cartridge 42 has been inhibited, and the DNA ink cartridge 42 of a serial number for which the end flag is on, cannot be used irrespective of the printing person (for example, in a case of FIG. 5, the DNA ink cartridge 42 of serial number '00001001' cannot be used).

The judging section 32 makes a judgment of whether or not the printing is to be carried out by using the DNA ink, based on the data acquired by the fingerprint reader 12 and the IC tag reader 17, a judgment result in the installation judging section 21, and the data stored in the data storage section 31. More specifically, a judgment is made that the printing can be carried out by using the DNA ink only when the following situations are satisfied: the DNA ink cartridge 42 is installed in the cartridge installing section 16a; the pattern data of the DNA read by the IC tag reader 17 and the pattern data of fingerprints read by the fingerprint reader 12 match (coincide) with both the mutually corresponding pattern data of the DNA and the pattern data of the fingerprint stored in the data storage section 31; and the end flag corresponding to the serial number read by the IC tag reader 17 of the data storage section is not on.

In cases other than the abovementioned cases, a judgment is made that the printing is not to be carried out using the DNA ink. Concretely, a judgment is made that the printing is not to be carried out by using the DNA ink, in any of cases namely when the DNA ink cartridge 42 has not been installed in the cartridge installing section 16a; when the end flag corresponding to the serial number read by the IC tag reader 17 of the data storage section 31 is not on; and the pattern data of the DNA read by the IC tag reader 17 and the pattern data of the fingerprints read by the fingerprint reader 12 do not match with at least one of the mutually corresponding DNA pattern data and the fingerprint data stored in the data storage section 31.

In the abovementioned printing instruction section 23, when a judgment is made by the judging section 32 that the printing is to be carried out by using the DNA, and when the DNA-ink printing mode has been selected in the printing mode selecting section 24, an instruction is given to the driver IC 23 to carry out printing by using both the DNA ink and the image forming ink. In addition, when a judgment is made in the judging section 32 that the printing is not to be carried out by using the DNA ink, an instruction is given to carry out the printing by using only the image forming ink (carrying out printing by using the DNA ink is inhibited). In other words, the printing instruction section 23 includes the inhibiting mechanism of the present invention. Moreover, even when the normal printing mode has been selected in the printing mode selecting section 24, the printing instruction section 23 gives an instruction to carry out printing by using only the image forming ink.

Here, in the printer 3, since the printing is carried out by using only the image forming ink when the DNA ink cartridge 42 is not installed in the cartridge installing section 16a, even the printing person who does not have the DNA ink cartridge 42 can carry out the normal printing by the printer 3.

Moreover, the printing in which only the image forming ink is used is carried out by selecting the normal printing mode by the printing person even in a state of the DNA ink cartridge 42 installed in the cartridge installing section 16a. Therefore, it is possible to carry out the printing in which the DNA ink is used only when it is necessary, and to suppress a wasteful consumption of the DNA ink. Moreover, it is not necessary for the printing person to remove and insert every time the DNA ink cartridge 42 at the time of creating in succession a printed matter, in which the printing is carried out by using the DNA ink, and another printed matter, in which the printing is carried out by using only the image forming ink.

The data updating section 33 updates contents of the data storage section 31. Concretely, when the ink in the DNA ink cartridge 42 installed in the cartridge installing section 16a is judged to have been exhausted by the ink-shortage judging section 22, an end flag corresponding to the serial number read by the IC tag reader 17 of the data storage section 31 is put on. Accordingly, the DNA ink cartridge 42 cannot be used after the ink in the DNA ink cartridge 42 has been exhausted, it is possible to prevent an unauthorized use of the DNA ink cartridge such as in a case in which a printed matter is created by another person. For example, it is possible to prevent a different DNA ink being filled in the vacant DNA ink cartridge 42 by a vicious person, and the printing being carried out by using mistakenly that re-filled DNA ink cartridge 42 by the printing person.

Moreover, the data updating section 33 registers (records) data of a new DNA ink cartridge 42 in the data storage section 31. A method for carrying out registration of data is exemplified as shown below; a DNA ink cartridge 42 to be added newly is installed in the cartridge installing section 16a, and the pattern data of DNA and the serial number are read from the IC tag 42a by the IC tag reader 17, and the pattern data of fingerprints of the printing person is read by the fingerprint reader 12. Further, the data which is read is stored upon associating in the data storage section 31. Apart from this, the data updating section 35 also carries out deletion of data of the DNA ink cartridge 42 stored in the data storage section 31.

The transceiving unit 34 is connected to the transceiving unit 20 of the printer 3. Accordingly, a communication is carried out between the host 2 and the printer 3.

Figure 6A:
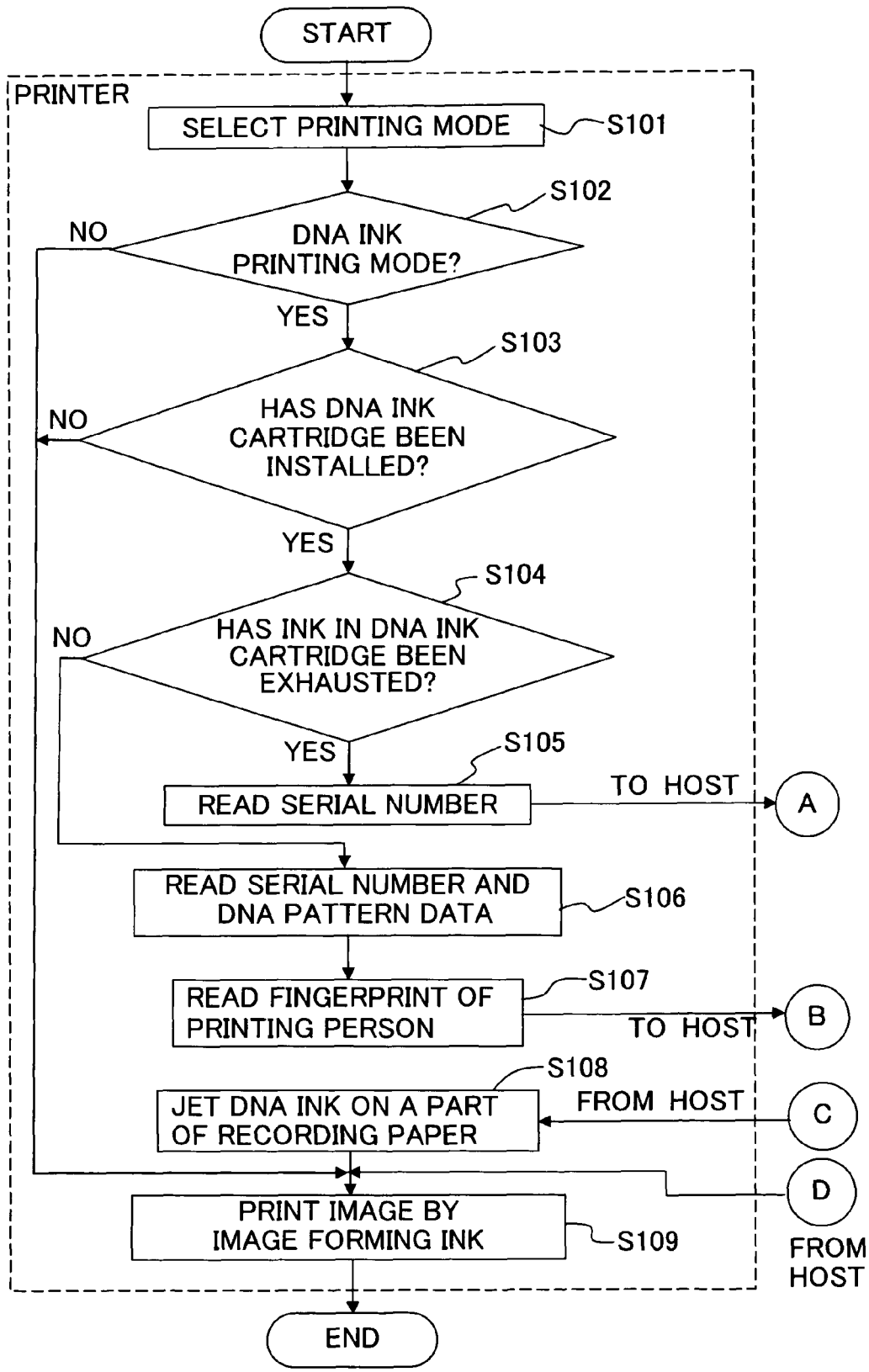
FIGS. 6A and 6B are flowcharts showing an operation of the image forming system.
Figure 6B:
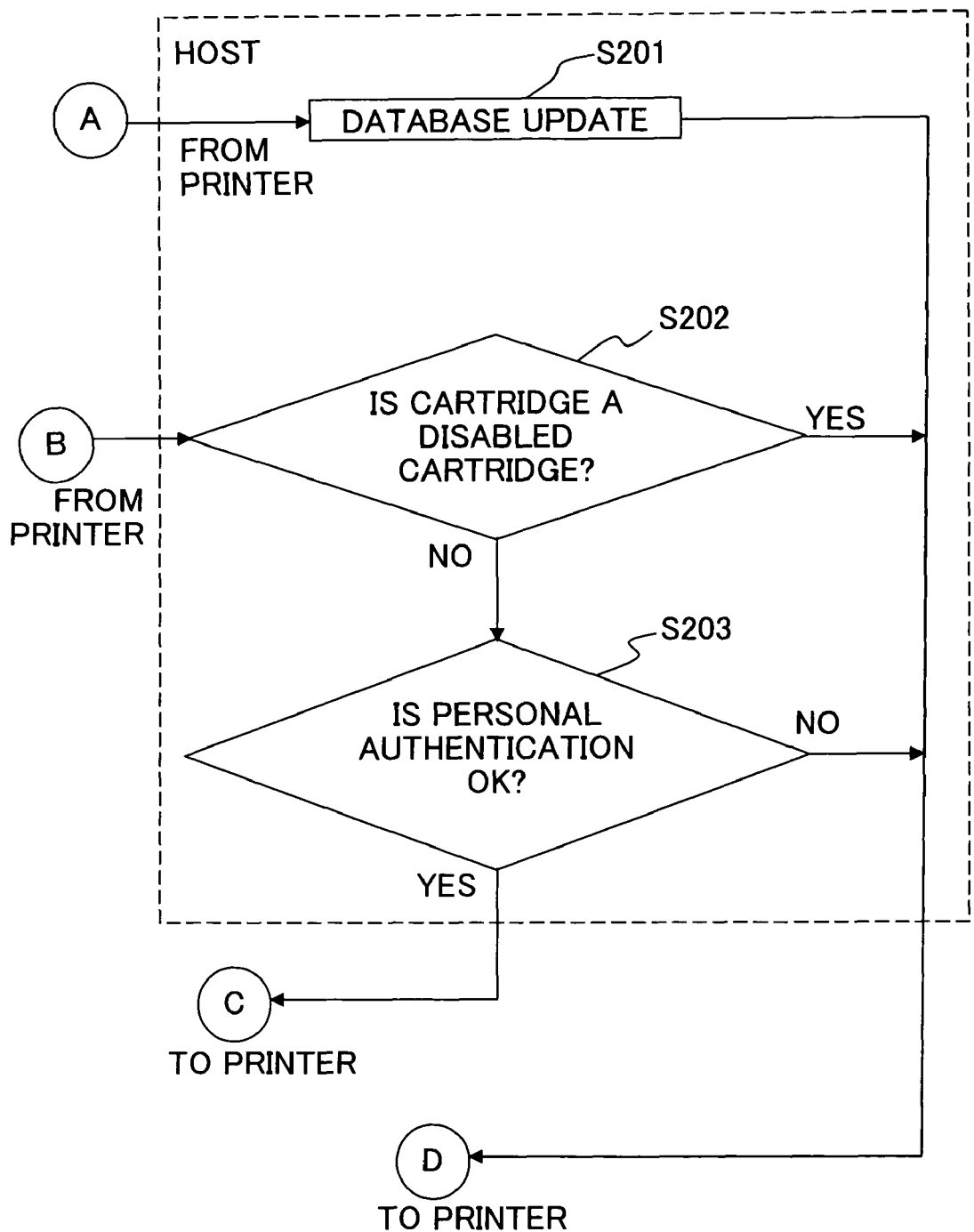

Next, a process in which the printing is carried out in the image forming system 1 will be described with reference to FIGS. 6A and 6B. FIGS. 6A, 6B are flowcharts showing this process. The process shown in FIGS. 6A and 6B starts when a printing command is input from the PC 4 to the printer 3 by the printing person. In FIGS. 6A and 6B, processing in steps from step S101 to step S109 which will be described below is executed in the printer 3, and processing in steps from step S201 to step S203 is executed in the host 2.

After the printing command is input from the PC 4 by the printing person, according to an instruction such as a display of a screen which is not shown, a command which instructs that one of the DNA-ink printing mode and the normal printing mode is to be selected is input from the PC 4 by the printing person. According to the command, the printing mode selecting section 24 selects one of the DNA-ink printing mode and the normal printing mode (step S101). Further, when the normal printing mode is selected (NO at step S102), the process advances to step S109 which will be described later.

On the other hand, when the DNA-ink printing mode is selected (step S102), the installation judging section 21 makes a judgment of whether or not the DNA ink cartridge 42 has been installed in the cartridge installing section 16a (step S103). When the DNA ink cartridge 42 has not been installed in the cartridge installing section 16a (NO at step S103), the process advances to step S109 which will be described later.

When the DNA ink cartridge 42 has been installed in the cartridge installing section 16a (YES at step S103), the ink-shortage judging section 22 makes a judgment of whether or not the ink in the DNA ink cartridge 42 has been exhausted (step S104).

When the ink in the DNA ink cartridge 42 has been exhausted (YES at step S104), a serial number of this DNA ink cartridge 42 is read from the IC tag 42a by the IC tag reader 17 (step S105), and transmitted to the host 2. In the host 2, on receiving the serial number, the data updating section 35 puts on an end flag corresponding to that serial number in the data storage section (updates the data storage section 31) (step S201). Thereafter, the process advances to step S109 which will be described later.

When the ink in the DNA ink cartridge 42 has not been exhausted (NO at step S104), a serial number and the pattern data of the DNA is read from the IC tag 42a by the IC tag reader 17 (step S106, attribute-information acquiring step), and next, the pattern data of fingerprint of the printing person is read by the fingerprint reader 12 (step S107, printing-person specifying information acquiring step). The data which has been read at step S106 and step S107 is transmitted to the host 2 (transmitting step).

In the host 2, a judgment of whether or not an end flag corresponding to the serial number which is received is on, in other words, a judgment of whether the DNA ink cartridge 42 which has been installed is a disabled cartridge of which the use has been inhibited is made by the judging section 32 (step S202, judging step). When the DNA ink cartridge 42 which has been installed is a cartridge of which the use is inhibited, (YES at step S202), a judgment is made that the printing in which the DNA ink is used is not to be carried out, and a judgment result is transmitted to the printer 3. In other words, the printer 3 receives the judgment result from the judging section 32 (receiving step). Further, the process advances to step S109 which will be described later.

When the DNA ink cartridge 42 which has been installed is not the ink cartridge of which the use is inhibited (NO at step S202), personal authentication is carried out by verifying the pattern data of the DNA and the pattern data of the fingerprint received, with the pattern data of the DNA and the pattern data of the fingerprints stored in the data storage section 31, by the judging section 32 (step S203, judging step).

When the received pattern data of the DNA and the received pattern data of the fingerprints do not match (coincide) with at least one of the mutually corresponding pattern data of the DNA and the pattern data of the fingerprints stored in the data storage section 31 (personal authentication is not possible) (NO at step S203), a judgment is made that the printing by using the DNA ink is disable, and the judgment result is transmitted to the printer 3. In other words, the printer 3 receives the judgment result made by the judging section 32 (receiving step). Further, the process advances to step S109. On the other hand, when the pattern data of the DNA and the pattern data of the fingerprints received match with any of the mutually corresponding pattern data of the DNA and the pattern data of the fingerprints stored in the data storage section 31 (personal authentication is possible) (YES at step S203), a judgment is made that the printing is to be carried out by using the DNA ink, and the judgment result is transmitted to the printer 3. In other words, the printer 3 receives the judgment result made by the judging section 32 (receiving step).

Upon receiving the judgment result, in the printer 3, an instruction is given by the printing instruction section 23 to carry out the printing in which both the DNA ink and the image forming ink are used, and according to this instruction, the driver IC 25 controls the DNA ink head 16 to jet the DNA ink on to a part of the recording paper P (step S108). Next, the driver IC 25 controls the image forming head 15 to perform printing by the image forming ink on the recording paper P (step S109).

In case the printing is carried out by the method which is described above, the printing using the DNA ink is authorized only when the following situations are satisfied; the use of the DNA ink cartridge 42 has not been inhibited; the pattern data of the DNA which has been read by the IC tag reader 17 matches with the corresponding pattern data of the DNA (the pattern data of the corresponding DNA) which is stored in the data storage section 31; and the pattern data of the fingerprint which has been read by the fingerprint reader 12 matches with the corresponding pattern data of the fingerprints which is stored in the data storage section 31. Consequently, it is possible to specify assuredly a person who has created the printed matter by analyzing the DNA ink adhered to the printed matter.

According to the embodiment which has been described above, the judging section 32 makes a judgment of whether or not the printing is to be carried out by using the DNA ink. In order to achieve the judgment, the judging section 32 verifies the pattern data of the DNA ink which has been read by the IC tag reader 17 and the pattern data of the fingerprints of the printing person which has been read by the fingerprint reader 12 with the pattern data of the DNA and the pattern data of the fingerprints stored in the data storing section 31. Therefore, it is possible to prevent the printing being carried out in an unauthorized manner by using the DNA ink which is not associated with the printing person. Accordingly, it is possible to specify assuredly the printing person of the printed matter by analyzing the DNA ink adhered to the printed matter.

Moreover, since the DNA ink cartridge 42 has the IC tag 42*a*, and since it is possible to read the pattern data of the DNA from the IC tag 42*a* by the IC tag reader 17, the reading of the pattern data of the DNA becomes easy.

Moreover, end flags corresponding to the serial numbers of the DNA ink cartridge 42 are stored in the data storage section 31. When the ink in the DNA ink cartridge 42 installed in the cartridge installing section 16*a* has been exhausted, an end flag corresponding to a serial number of that DNA ink cartridge 42 is set. Therefore, it is possible to prevent assuredly a different DNA ink being filled in the DNA ink cartridge 42 having the ink-shortage, by a third person having a wrong intention, and creating a printed matter by using that identifiable ink by a printing person. In this manner, it is possible to prevent assuredly the identifiable ink cartridge 42 having the ink-shortage, being used in an unauthorized manner.

Moreover, at the time of carrying out printing by using the DNA ink, since the identifiable ink is jetted on to only a part of the recording paper P, it is possible to save an amount used of the identifiable ink.

Further, since the DNA ink is colorless, it is possible to let the recording paper P on which the printing has been carried out, to be indistinguishable at one glance whether the identifiable ink has been jetted thereon or not.

Moreover, since the printing is carried out by using only the image forming ink when the DNA ink cartridge 42 is not installed in the cartridge installing section 16*a*, a printing person who does not have the DNA ink cartridge 42 is also capable of carrying out the normal printing by the printer 3.

Moreover, even when the judging section 32 has made a judgment that the printing is to be carried out by using the DNA ink, it is possible for the printing person to select any one of the DNA-ink printing mode and the normal printing mode. Therefore, it is possible to carry out the printing in which the DNA ink is used only when necessary, and to suppress a wasteful consumption of the DNA ink. Moreover, when the same printing person carries out in succession the printing in which the DNA ink is used and the printing in which only the image forming ink is used, it is not necessary to remove and insert (install) every time the DNA ink cartridge 42.

Next, modified embodiments in which various modifications are made in this embodiment will be described below. However, same reference numerals are assigned to components having a structure same as in this embodiment and the description of such components is omitted appropriately.

In a first modified embodiment, the DNA ink cartridge 42 is used in common by persons belonging to a certain group, and a DNA ink which includes DNA of all the persons belonging to this group is filled in the DNA ink cartridge 42. As shown in FIG. 7A, serial numbers of the DNA ink cartridges 42, group code of a group which uses the DNA ink cartridge corresponding to the serial number, and end flags and the pattern data of fingerprints of all the persons belonging to that group are stored so as to associated with each other in the data storage section 31. Furthermore, as shown in FIG. 7B, the group codes and the pattern data of the DNA of all the persons belonging to the group corresponding to the group code are stored upon associating. Moreover, group code of the group which uses the DNA ink cartridge 42 is stored instead of the pattern data of the DNA, in the IC tag 42*a*. In the first modified embodiment, the group code in FIG. 7A and the pattern data of the DNA in FIG. 7B correspond to attribute information of the present invention.

In this case, at step 106 in the embodiment (refer to FIGS. 6A and 6B), the serial number and the group code are read by the IC tag reader 17 from the IC tag 42*a*, and at step S203 (refer to FIGS. 6A and 6B), the personal authentication is carried out by judging whether or not the pattern data of the fingerprints which has been read at step S107 (refer to FIG. 6A) matches with any of the pattern data of fingerprints corresponding to the group code which has been read at step S106, stored in the data storage section 31.

Moreover, in this case, it is possible to specify as to a person belonging to which group has created the printer matter by analyzing the DNA ink which is adhered to the printed matter which is created. Here, DNA of at least one person belonging to that group may be included in the DNA ink cartridge 42. Or, as it has been mentioned above, DNA of all the members belonging to that group may be included in the DNA ink cartridge 42. In this case, it is possible to specify assuredly the printing person of the printed matter (or a group to which that printing person belongs) even when a certain person belongs to a plurality of groups, and further, that person separately has a DNA ink cartridge for an individual. This is because, assuming that that person belongs to a certain group, in a printed matter which is created by using the DNA ink cartridge for that group and in a printed matter which is created by the DNA ink cartridge for the individual assuming that person as an individual (and not a group), the DNA ink adhered to the recording paper P have different compositions.

Figure 8A:
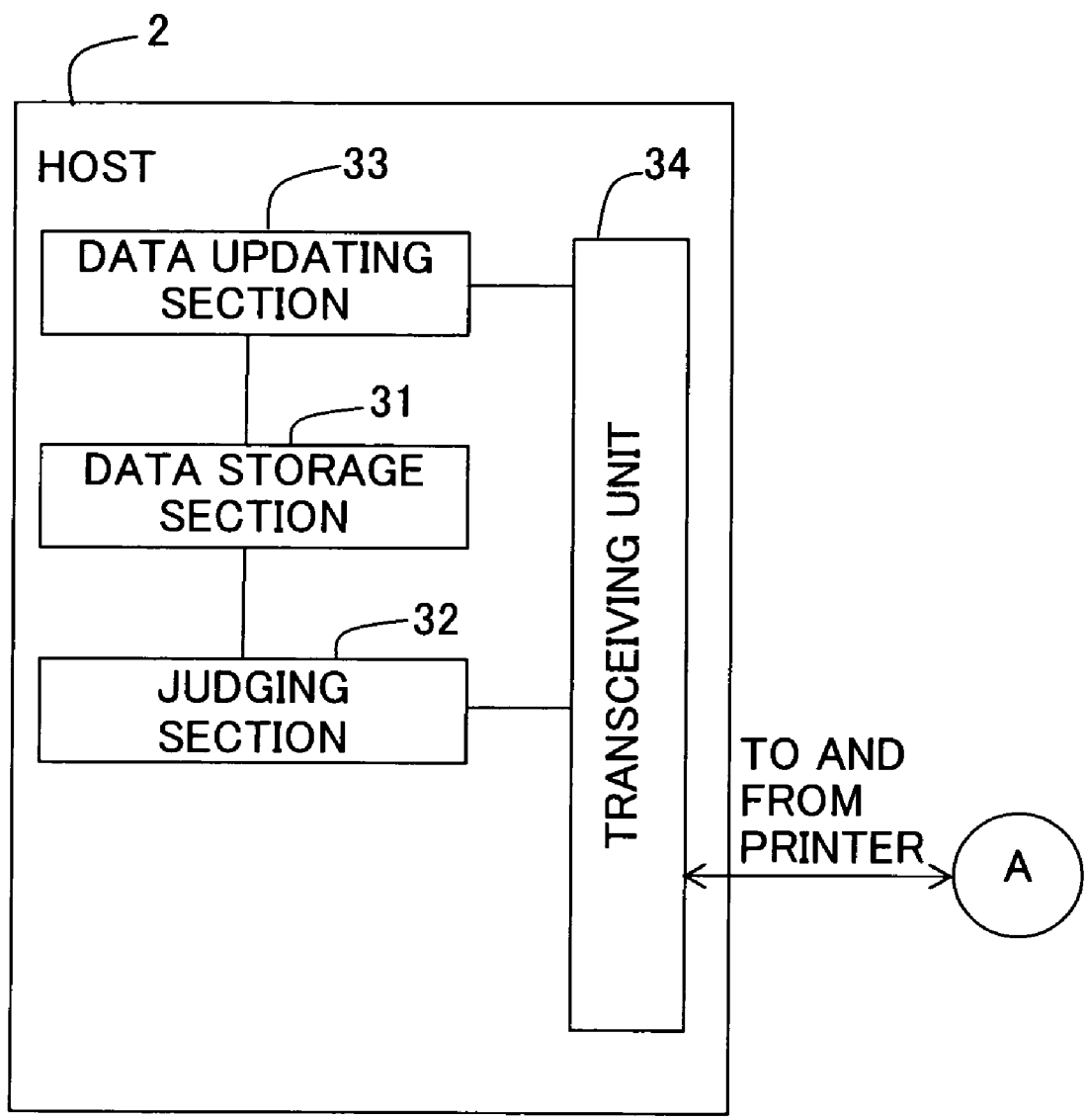
FIGS. 8A and 8B are block diagrams corresponding to FIGS. 4A and 4B, of a second modified embodiment.
Figure 8B:
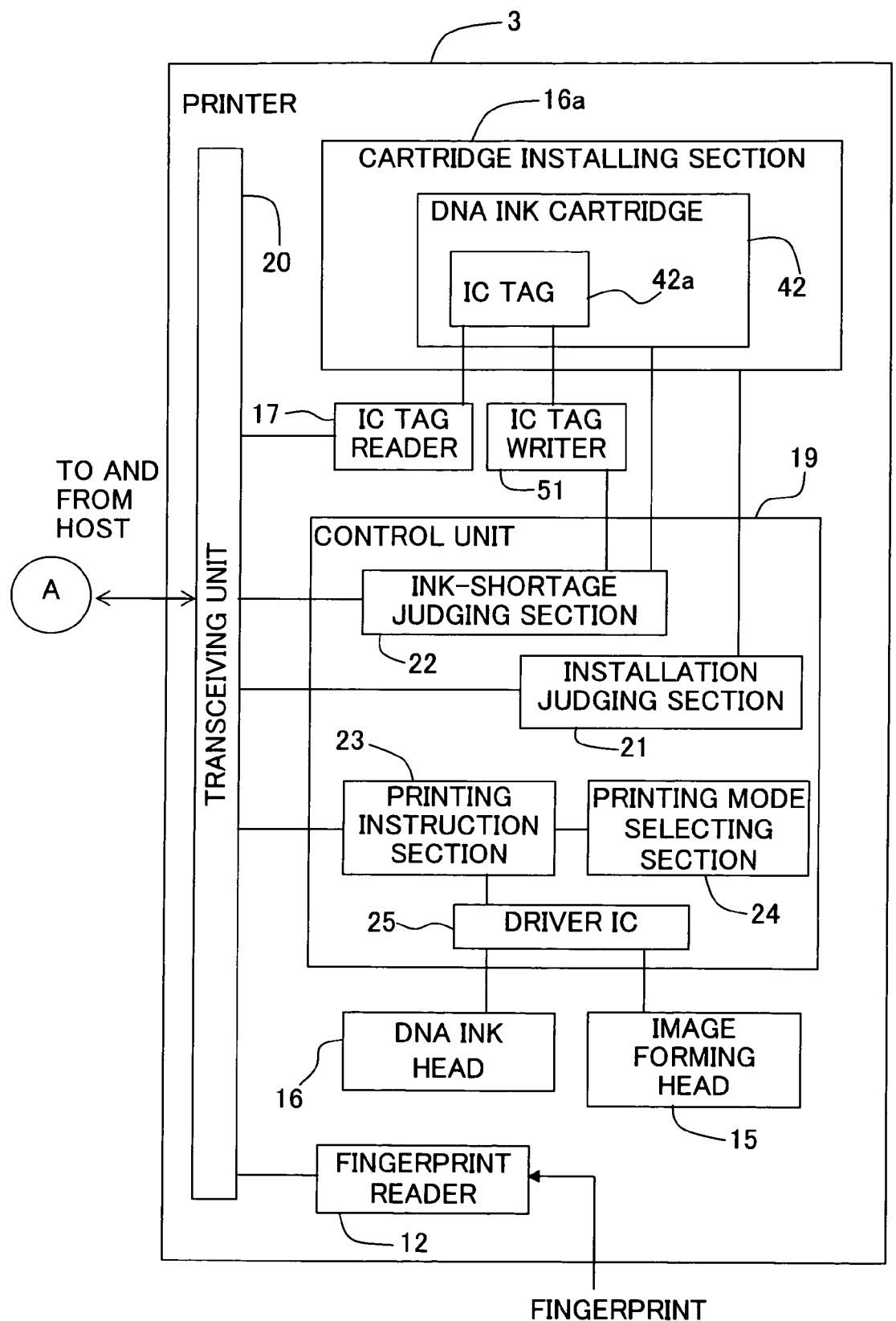

In a second modified embodiment, in addition to the serial number and the pattern data of DNA, information indicating whether or not that DNA ink cartridge 42 is a disabled cartridge of which the use has been inhibited (disable information) is recorded in the IC tag 42*a* of the DNA ink cartridge 42. Moreover, as shown in FIGS. 8A and 8B, the printer 3 further includes an IC tag writer 51 (information updating mechanism) which rewrites data in the IC tag 42*a*.

Figure 9A:
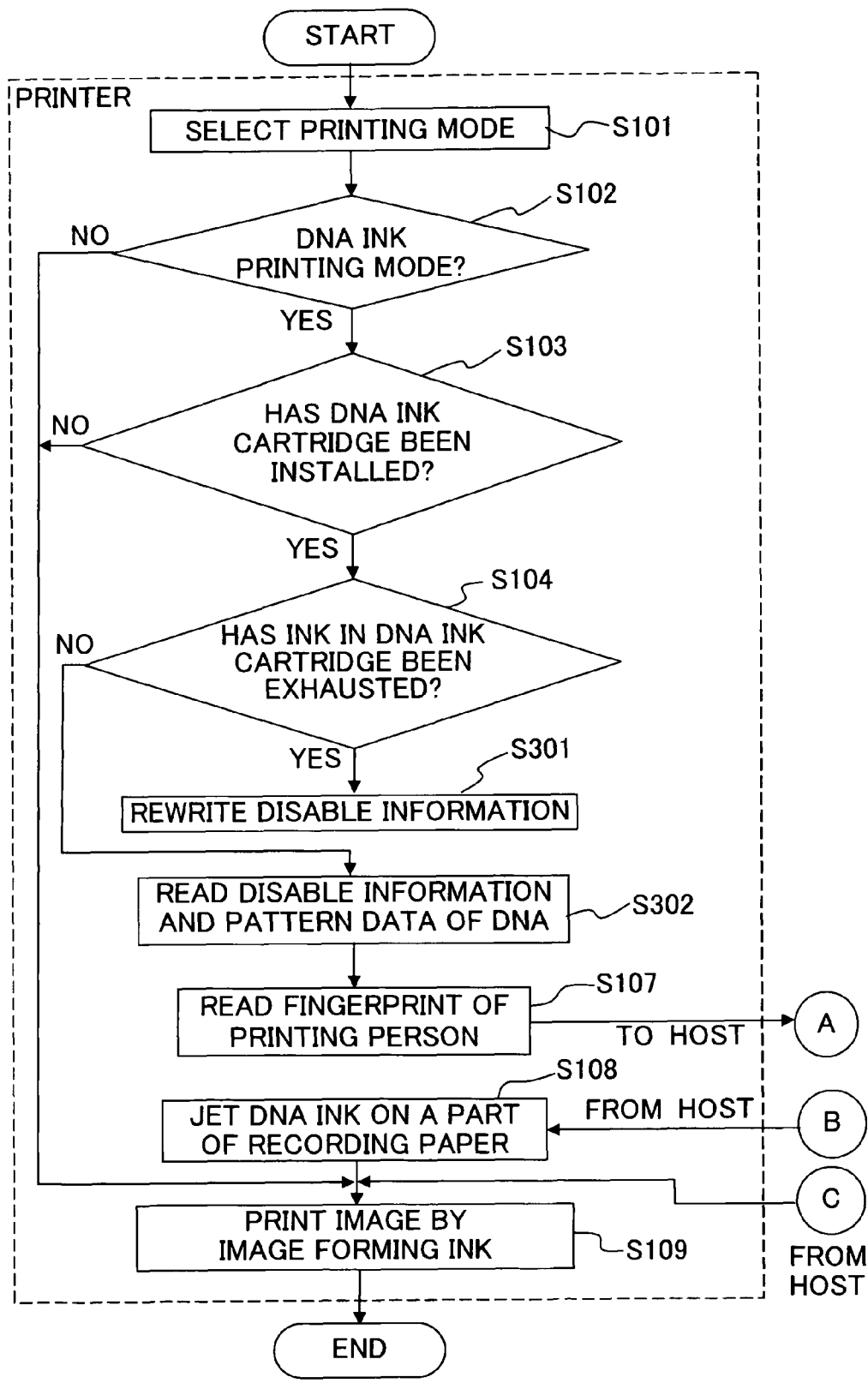
FIGS. 9A and 9B are flowcharts corresponding to FIGS. 6A and 6B, of the second modified embodiment.
Figure 9B:
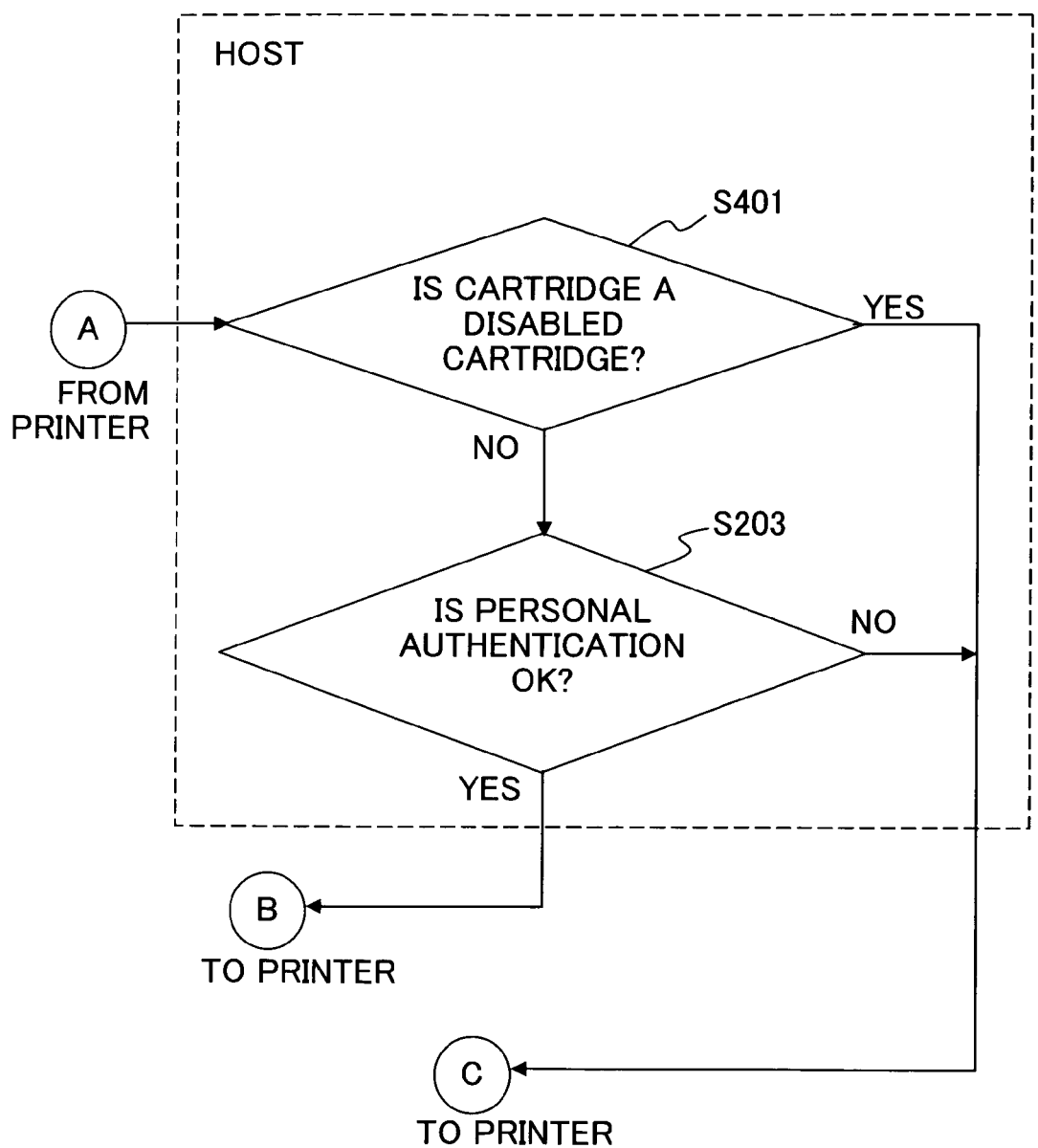

In the second modified embodiment, as shown in FIGS. 9A and 9B, instead of steps S105 and step S201 in the embodiment (refer to FIGS. 6A and 6B), the disable information recorded in the IC tag 42*a* is rewritten to information which indicates that the use of the DNA ink cartridge 42 has been inhibited (step S301). Moreover, instead of step S106 in the embodiment (refer to FIG. 6A), the pattern data of DNA and the disable information are read by the IC tag reader 17 from the IC tag 42*a* (step S302). Furthermore, instead of step S202 in the embodiment (refer to FIG. 6B), a judgment of whether or not the DNA ink cartridge 42 which is installed is a cartridge of which the use has been inhibited, is made based on the disable information which is read at step S302 (step S401).

Even in this case, it is possible to prevent a printing matter being created by an unauthorized person, by filling the different DNA ink in the vacant DNA cartridge, by a third person having a wrong intention, and carrying out the printing by using that DNA ink cartridge 42 by the printing person. Moreover, in this case, an end flag as in the case of the embodiment is not stored in the data storage section 31. In the second modified embodiment, the data storage section 31 corresponds to a first memory of the present invention. Moreover, the IC tag 42*a* serves as an ink identification information retention mechanism, a cartridge-ID information retention mechanism, and a disable-information retention mechanism of the present invention. Moreover, the IC tag reader 17 serves as an ink identification information acquiring mechanism, a cartridge-ID information acquiring mechanism, and a disable-information acquiring mechanism of the present invention.

Figure 10A:
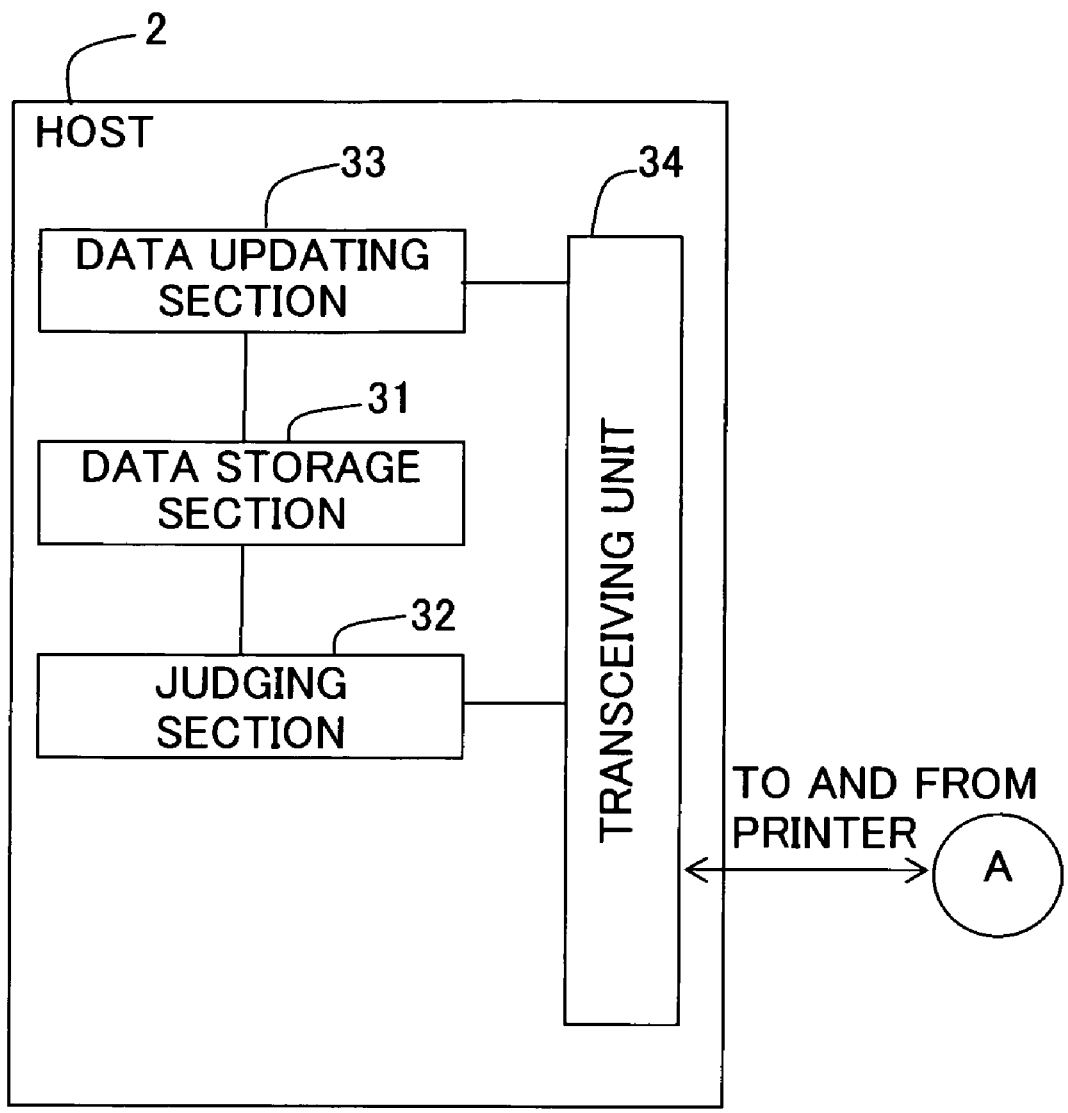
FIGS. 10A and 10B are block diagrams corresponding to FIGS. 4A and 4B, of a third modified embodiment.
Figure 10B:
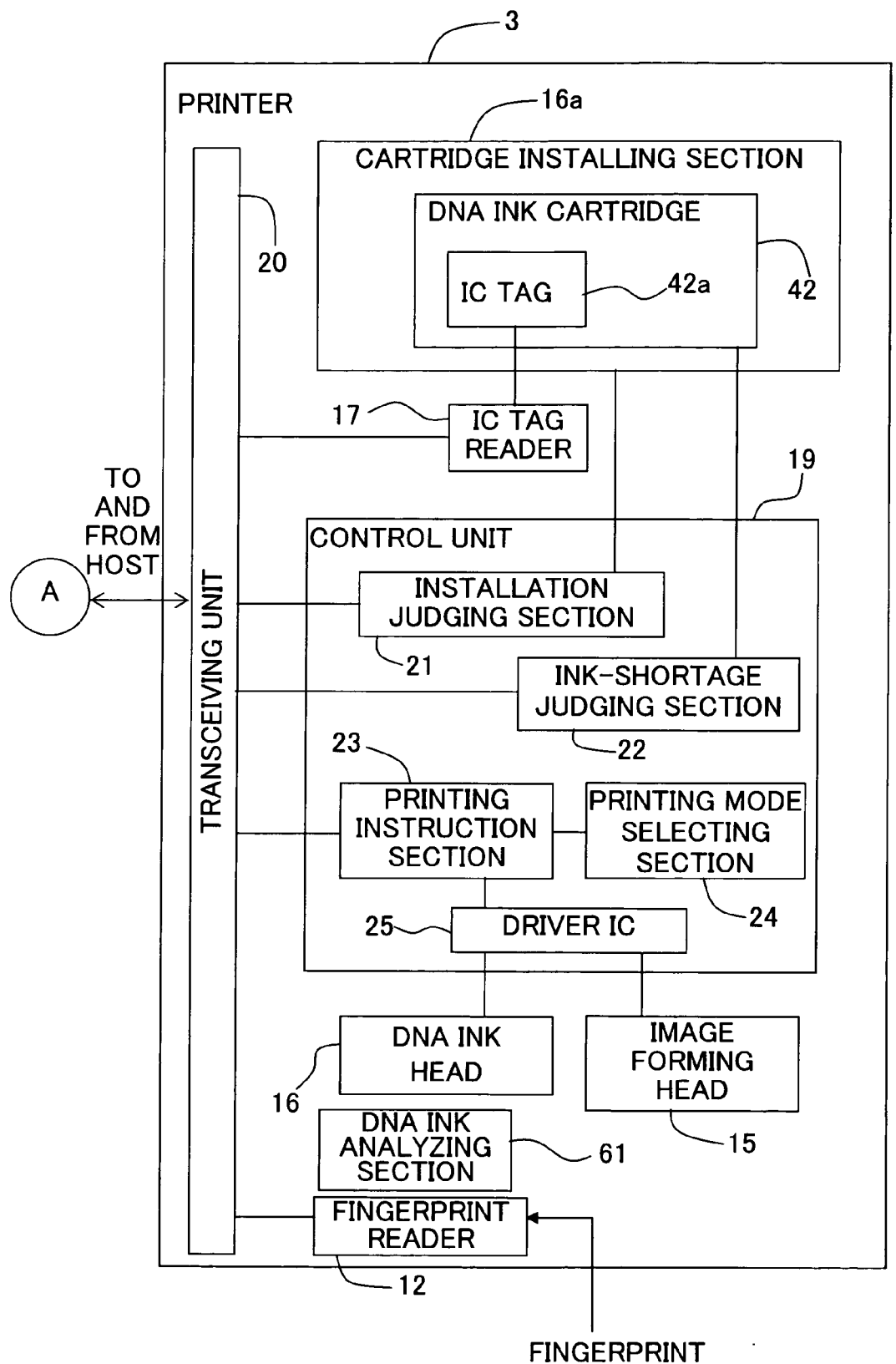

In a third modified embodiment, as shown in FIGS. 10A and 10B, the printer 3 further includes a DNA ink analyzing section 61 which analyzes the DNA ink in a DNA ink cartridge 42. Here, the DNA ink analyzing section 61 collects the DNA ink which is jetted from the DNA ink head 16 for example, or collects the DNA ink which is discharged from the DNA ink head 16 by carrying out a purge, and analyzes the ink which has been collected.

Figure 11B:
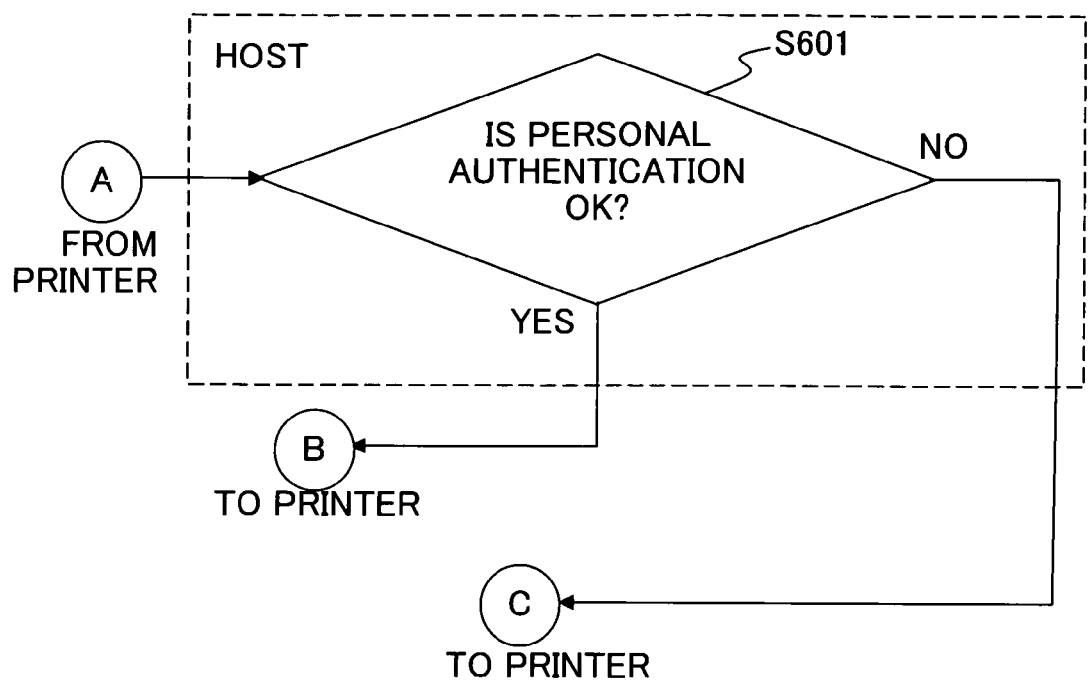

In the third modified embodiment, as shown in FIGS. 11A and 11b, without carrying out processes at steps from S104 to S106, and step S201 (refer to FIGS. 6A and 6B), when the DNA ink cartridge 42 is installed in the cartridge installing section 16a (YES at step S103), the DNA ink is analyzed by the DNA ink analyzing section 61 and the pattern data of the DNA is acquired (step S501), and thereafter, the process advances to step S107 similar as in the embodiment. Moreover, after step S107, without carrying out the processes at step S202 and S203 in the embodiment (refer to FIG. 6B), the personal authentication is carried out by verifying the pattern data of the DNA which has been acquired by the analysis of the DNA ink at step S501 and the pattern data of fingerprint which is read at step S107 with the pattern data of DNA and the pattern data of fingerprints stored in the storage section 31 (step S601).

In a case of the third modified embodiment, since the attribute information of the ink is acquired by directly analyzing the DNA ink in the DNA ink cartridge 42, even when another DNA ink is filled in the vacant DNA ink cartridge 42, by a third person with a wrong intention, it is possible to find out the unauthorized ink cartridge 42 easily. Therefore, the printing person does not carry out printing by using a different DNA ink. Consequently, in the third modified embodiment, even when an end flag as in the embodiment has not been stored in the data stored section 31, it is possible to have a highly reliable security.

Figure 12A:
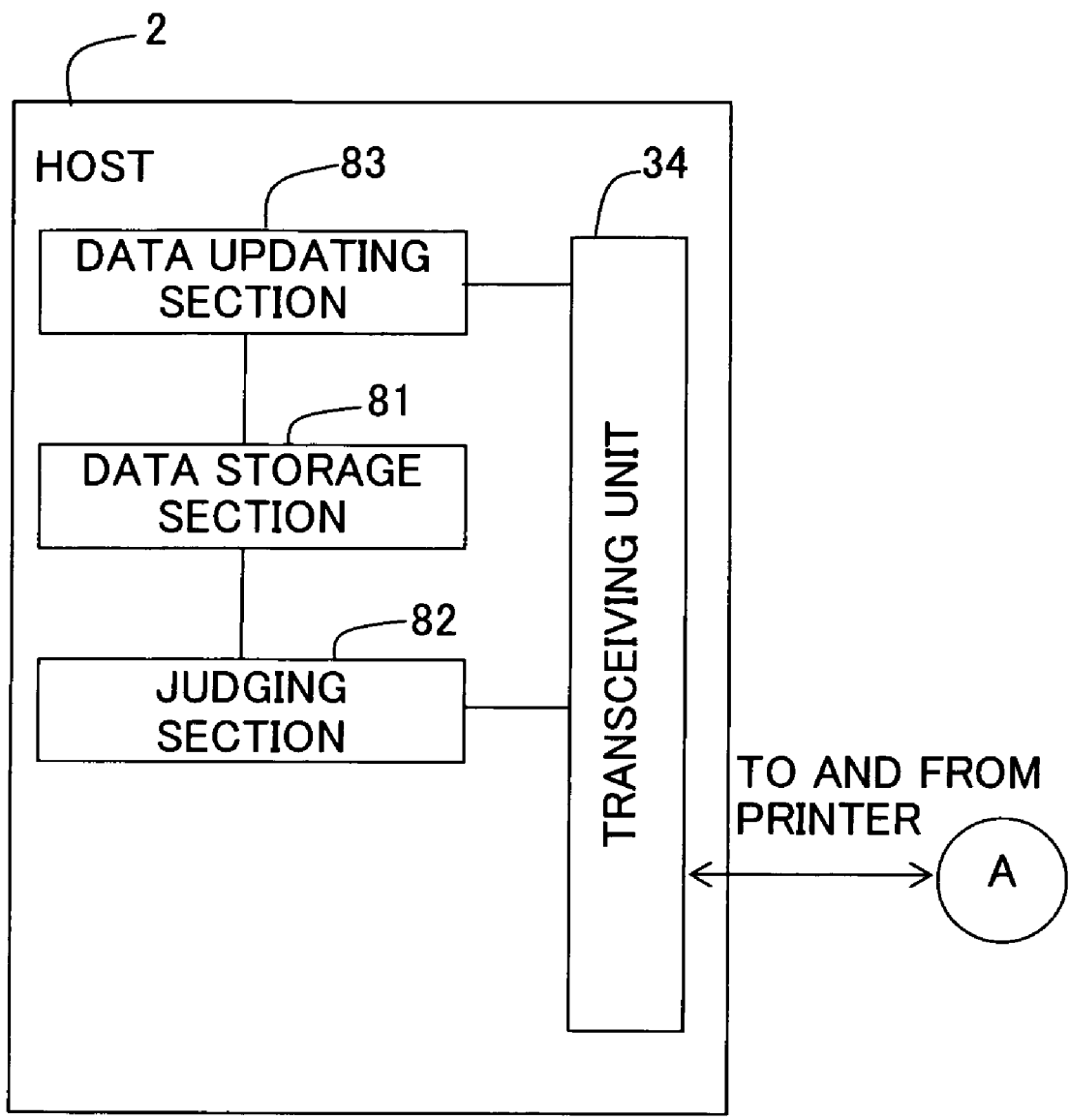
FIGS. 12A and 12B are block diagrams corresponding to FIGS. 4A and 4B, of a fourth modified embodiment.
Figure 12B:
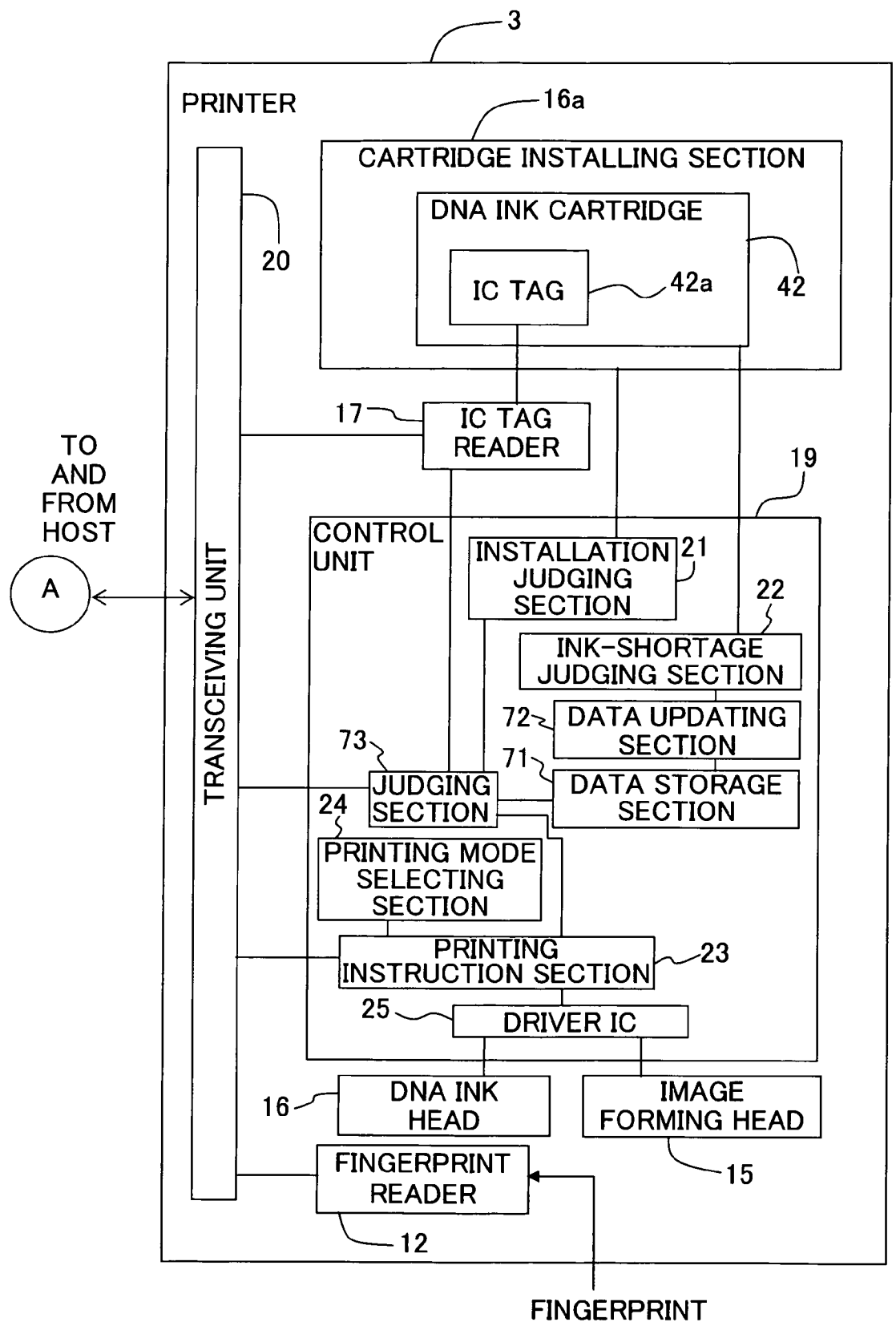

In the embodiment, the host 2 has the data storage section 31, the judging section 32, and the data updating section 33. However, without restricting to such structure, the printer may have a part of these functions. For example, in a fourth modified embodiment, as shown in FIGS. 12A and 12B, the control unit 19 of the printer 3 has a data storage section 71, a data updating section 72, and a judging section 73 in addition to the installation judging section 21, the ink-shortage judging section 22, the printing instruction section 23, the printing mode selecting section 24, and the driver IC 25 similar as in the embodiment. On the other hand, the host 2 has a data storage section 81, a judging section 82, and a data updating section 83.

Serial numbers and end flags corresponding to the serial numbers are stored upon associating in the data storage section 71. In other words, the data storage section 71 corresponds to a second memory of the present invention. When a judgment that the ink in the DNA ink cartridge 42 installed has been exhausted is made in the ink-shortage judging section 22, the data updating section 72 puts on the end flag corresponding to the serial number corresponding to that DNA cartridge 42, which is stored in the data storage section 71.

On the other hand, pattern data of DNA and pattern data of fingerprint corresponding to the pattern data of DNA are stored upon associating in the data storage section 81 of the host 2. In other words, the data storage section 81 corresponds to the first memory of the present invention.

When the DNA ink cartridge 42 has not been installed in the cartridge installing section 16a, and when the end flag corresponding to the serial number of the DNA ink cartridge 42 installed in the cartridge installing section 16a of the data storage section 71 is on, the judging section 72 makes a judgment that the printing is not to be carried out by using the DNA ink.

When the DNA ink cartridge 42 has been installed in the cartridge installing section 16a, and when the end flag corresponding to the serial number of the DNA ink cartridge 42 which is installed, of the data storage section 71 is not on, the judging section 82 verifies the pattern data of DNA which is read by the IC tag reader 17 and the pattern data of fingerprint which is read by the fingerprint reader 12, with the pattern data of DNA and the pattern data of fingerprints stored in the data storage section 81. When the pattern data of DNA which has been read by the IC tag reader 17 and the pattern data of fingerprint which has been read by the fingerprint reader 12 matches with any of the mutually corresponding pattern data of DNA and the pattern data of fingerprints stored in the data storage section 81, the judging section 82 makes a judgment that the printing is to be carried out by using the DNA ink, and when do not match with any of these, the judging section 82 makes a judgment that the printing is not to be carried out by using the DNA ink. In other words, a section in which the judging section 72 and the judging section 82 are combined together corresponds to a judging mechanism of the present invention. The printing instruction section 23 gives printing instructions to the driver IC 25 similarly as in the embodiment, based on the judgment results of the judging section 72 and the judging section 82, and the printing mode which has been selected by the printing mode selecting section 24. The data updating section 83 carries out registration of data of the DNA ink cartridge 42 in the data storage section 81, and deletion of data of the DNA ink cartridge from the data storage section 81.

Figure 13:
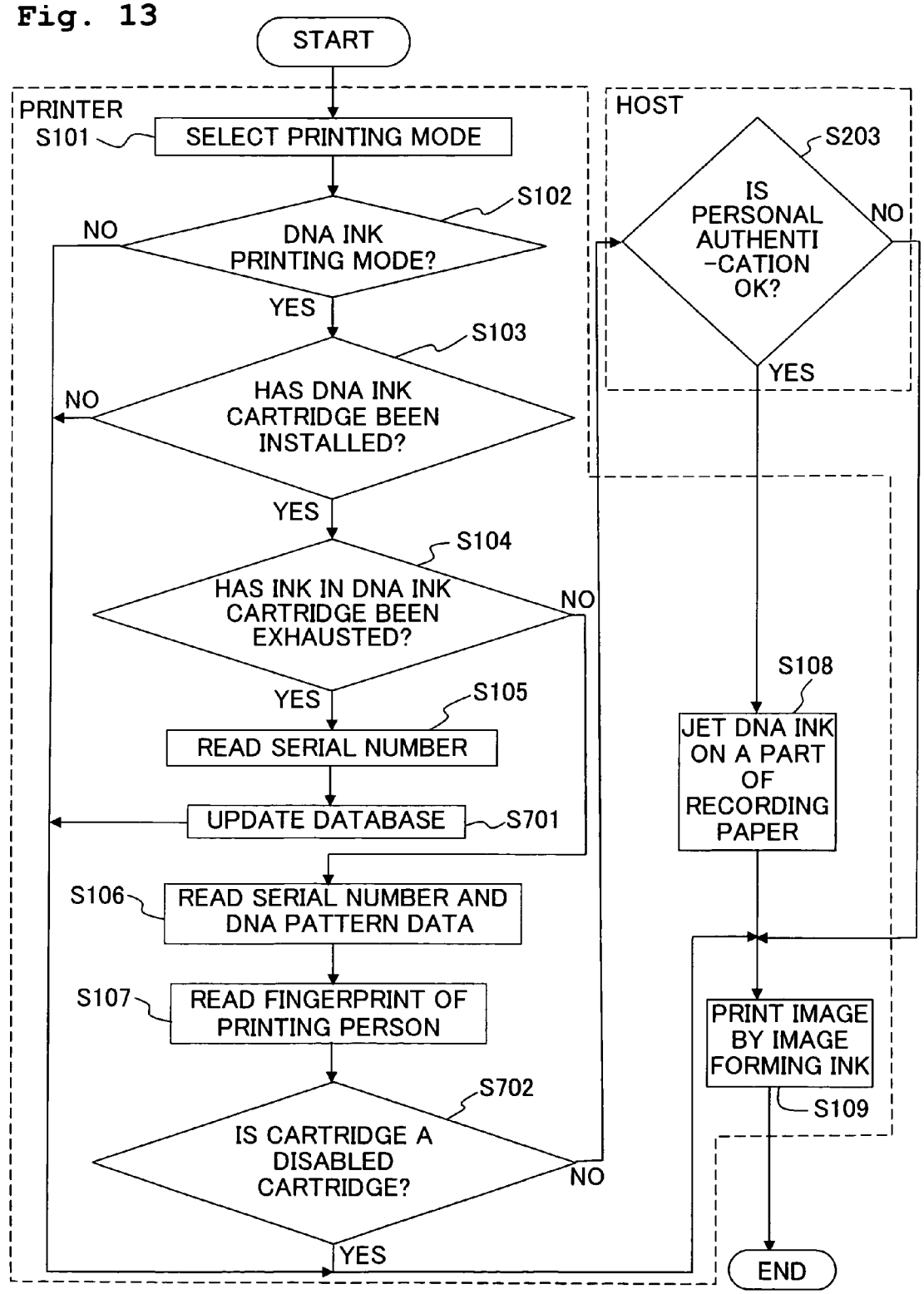
FIG. 13 is a flowchart corresponding to FIGS. 4A and 4B, of the fourth modified embodiment.

In the fourth embodiment, instead of step S201 in the embodiment (refer to FIGS. 6A and 6B), the data updating section 72 puts on the end flag corresponding to the serial number which has been read at step S105, of the data storage section 71, as shown in FIG. 13 (step S701). Moreover, instead of step S202 in the embodiment (refer to FIG. 6B), a judgment of whether or not the DNA ink cartridge 42 installed is a cartridge of which the use has been inhibited is made by the judging section 74 (step S702).

In this case, the pattern data of DNA and the pattern data of fingerprint which are personal information of high security level are managed in the host 2, and the serial number and the end flag of the DNA ink cartridge having the ink-shortage, which are information of a lower security level are managed in the printer 3. Therefore, it is possible to reduce traffic (a communication amount) between the host 2 and the printer 3 while protecting the personal information. In the fourth modified embodiment, when a judgment is made at step S702 that the DNA ink cartridge 42 which has been installed is not a cartridge which is inhibited (NO at step S702), the data which has been read at steps S106 and S107 is transmitted to the host 2. This corresponds to a transmitting step of the present invention. Moreover, a judgment result at step S202 is received by the printer 3. This corresponds to a receiving step of the present invention.

Figure 14:
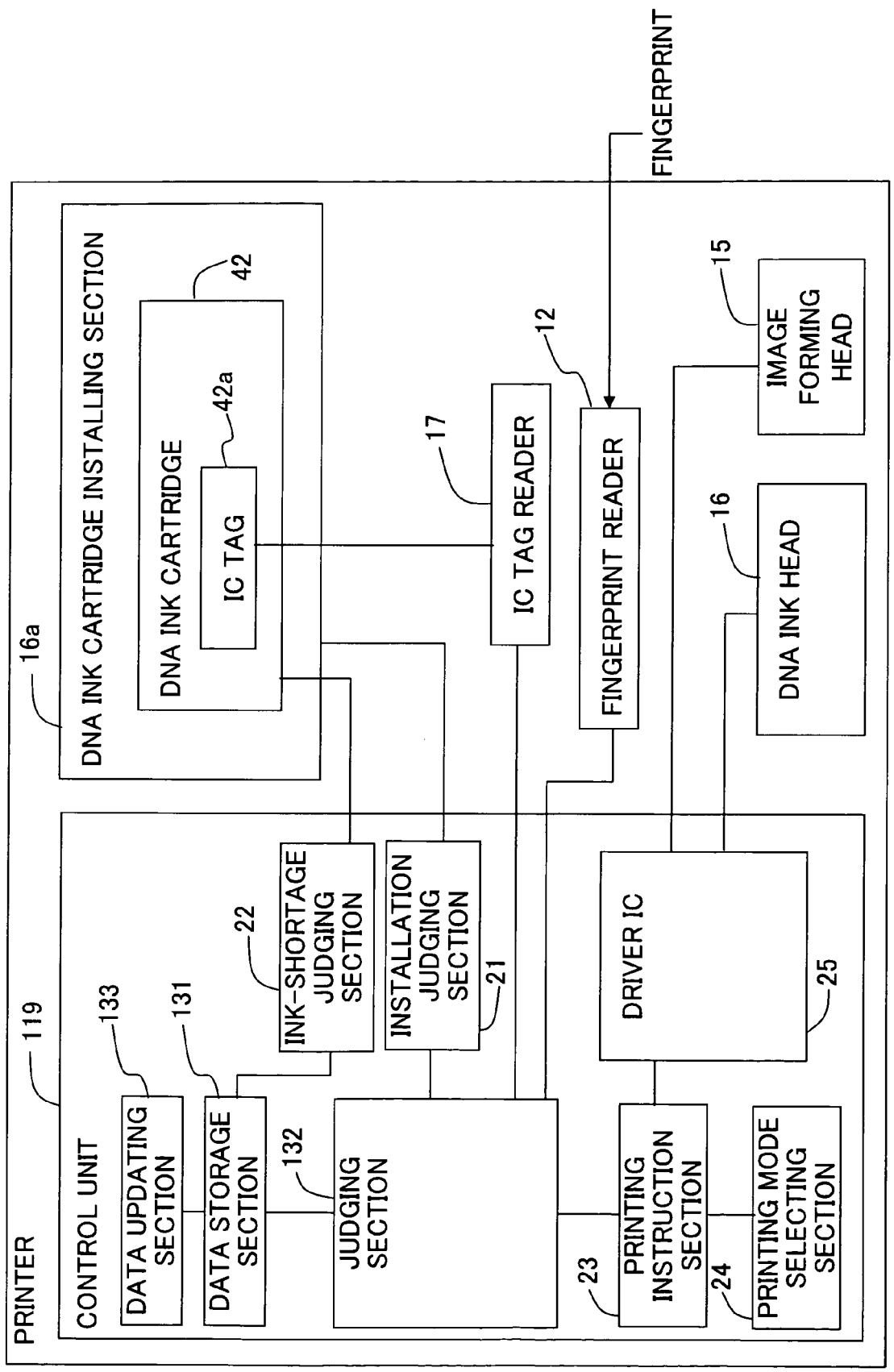
FIG. 14 is a block diagram corresponding to FIGS. 4A and 4B, of a fifth modified embodiment.

In a fifth modified embodiment, not the host 2 as in the embodiment (refer to FIG. 1) but a control unit 119 of the printer 13 has a data storage section 131, a data judging section 132, and a data updating section 133 in addition to the installation judging section 21, the ink-shortage judging section 22, the printing instruction section 23, the printing mode selecting section 24, and the driver IC 25 similar as in the embodiment, as shown in FIG. 14. The data storage section 131, the judging section 132, and the data updating section 133 have similar functions as the data storage section 31, the judging section 32, and the data updating section 33 respectively, in the embodiment (refer to FIGS. 4A and 4B).

Figure 15A:
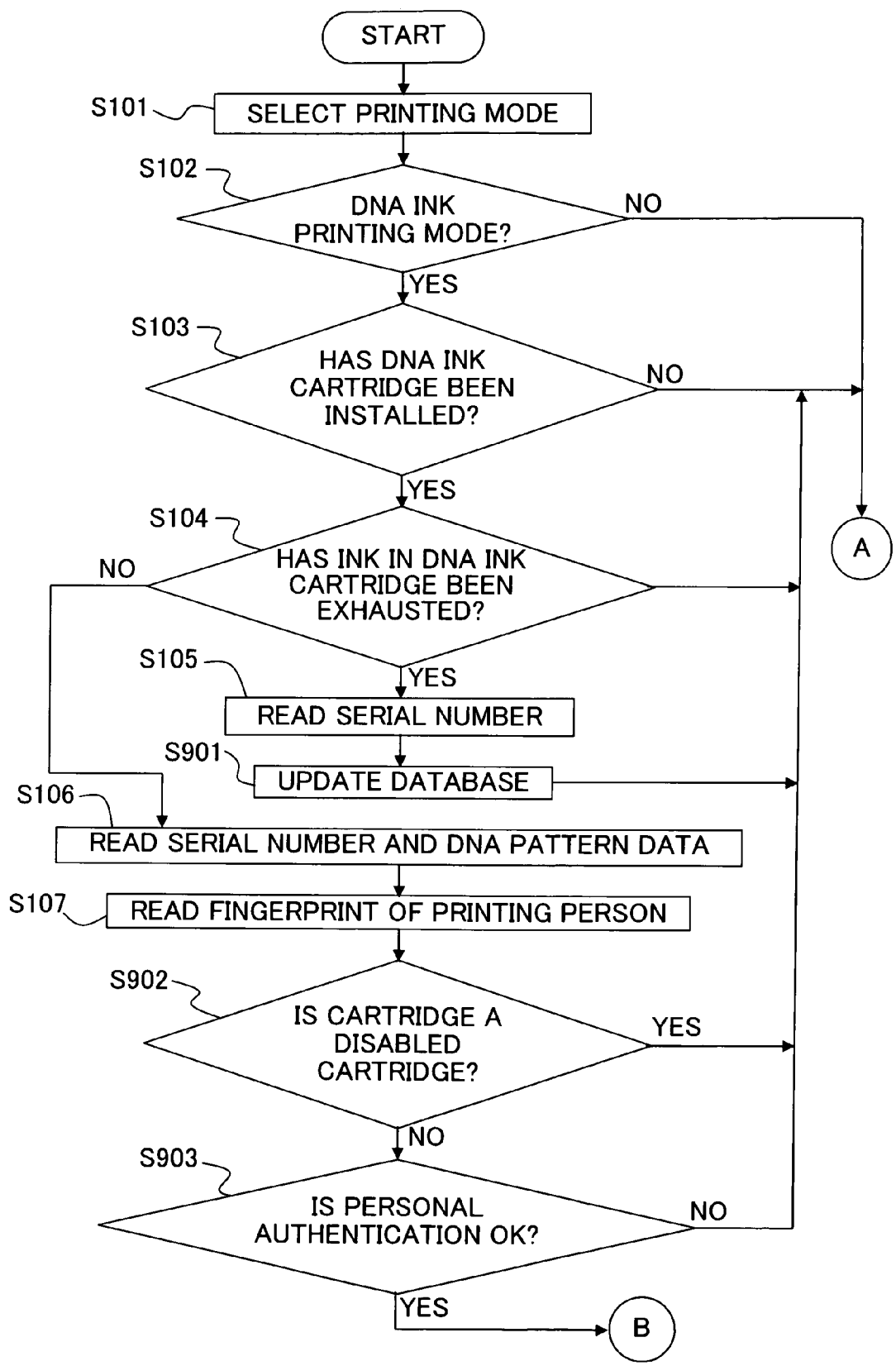
FIGS. 15A and 15B are flowcharts corresponding to FIGS. 6A and 6B, of the fifth modified embodiment.
Figure 15B:
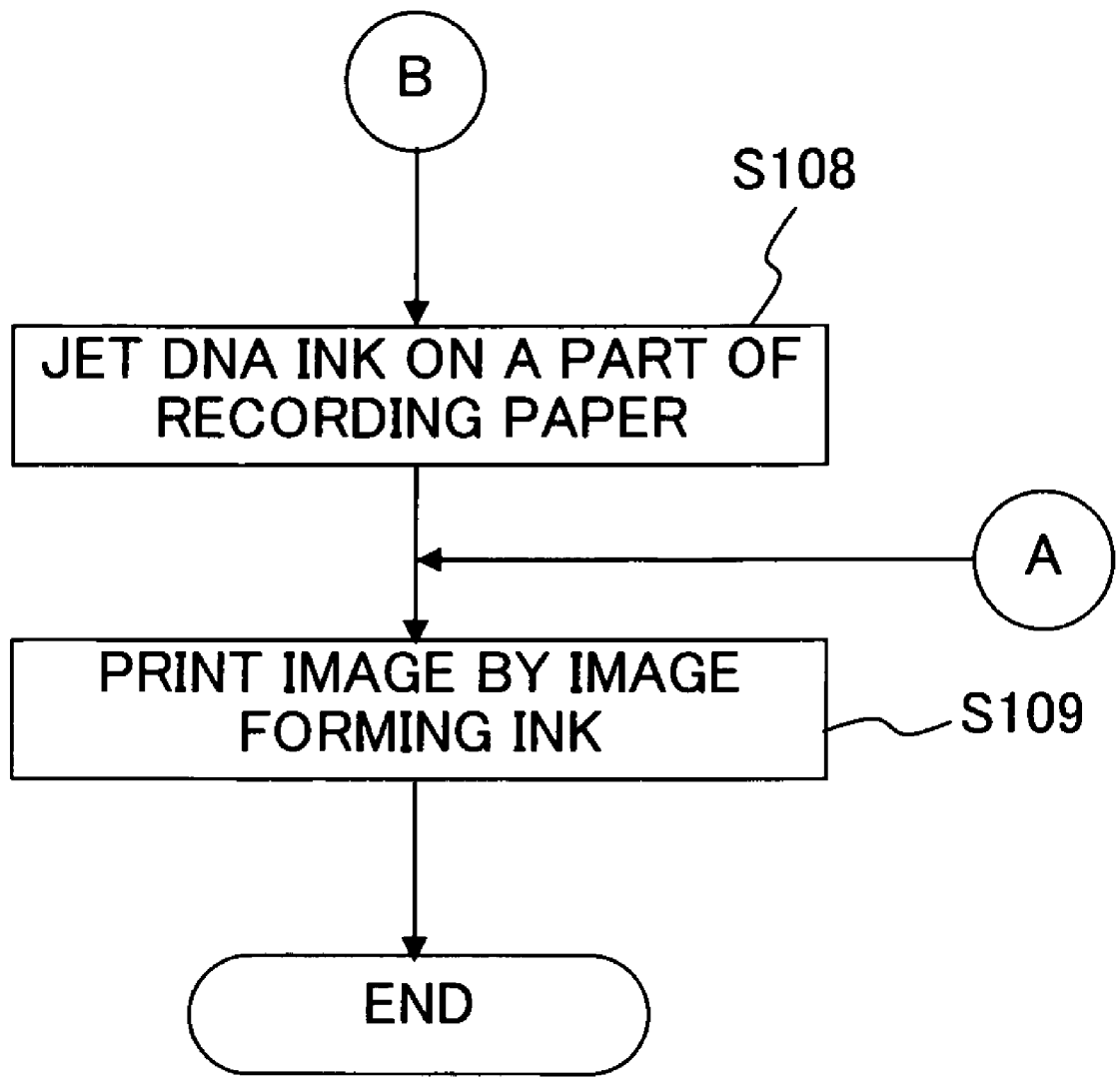

In the fifth modified embodiment, instead of step S201 in the embodiment (refer to FIG. 6B), an end flag corresponding to the serial number which has been read at step S105, of the data storage section 131, is put on as shown in FIG. 15A (step S901). Moreover, instead of step S202 in the embodiment (refer to FIG. 6B), a judgment of whether or not the DNA ink cartridge 42 which has been installed is a cartridge of which the use has been inhibited is made by the judging section 132 (step S902). Furthermore, instead of step S203 in the embodiment (refer to FIG. 6B), the personal authentication is carried out by verifying the pattern data of DNA which has been read at step S106 and the pattern data of fingerprint which has been read at step S107 with the pattern data of DNA and the pattern data of fingerprints stored in the data storage section 131 (step S903). In a case of the fifth modified embodiment, since the printer 3 is not required to be connected to a host, it is possible to carry out the printing singly, similarly as in the embodiment.

Moreover, in the embodiment, the pattern data of DNA was recorded in the IC tag 42a. However, instead of the pattern data of DNA, the pattern data of fingerprint of the printing person may be recorded (the attribute information may be assigned to match with printing-person specifying information of a printing person who is authorized to carry out printing by using the identifiable ink which is indicated by that attribute information). In this case, when the printing person makes an attempt to carry out printing by using own DNA ink cartridge 42, the pattern data of fingerprints which has been read by the IC tag reader 17 and the pattern data of fingerprint which has been read by the fingerprint reader 12 match. Consequently, the judging section 32, without reading information which is stored in the data storage section 31, directly verifies the two pattern data of fingerprints mentioned above, and depending on whether or not the two pattern data match, the judging section 32 is capable of making a judgment of whether or not the printing is to be carried out by using the DNA ink. Accordingly, it is possible to make a prompt judgment of whether or not the printing is to be carried out by using the DNA ink.

Moreover, in the abovementioned description, the DNA ink is jetted on to the recording paper. However, instead of the DNA ink, a nano particle ink, a special color ink and/or a functional ink may be jetted. These inks may be used independently or in combination.

The nano particle ink is an ink in which nano particles of a metal such as gold, silver, nano particles of a metallic compound, and a ceramics powder etc. are mixed in the ink. In a case of using such nano particle ink, when a nano particle ink which includes different nano particles is assigned to each individual or a group, and information which indicates types of the corresponding nano particles is recorded in the IC tag 42a, it is possible to specify the printing person of the printed matter by analyzing the nano particle ink which is adhered to the recording paper P.

Special color ink means inks of colors other than black ink and ink of three colors (cyan, magenta, and yellow) which are must for full-color printing. Concretely, the special color inks include light-color inks such as light cyan, light magenta, and light yellow, a golden color ink, a silver color ink, or an ink of a special color such as a corporate color. In a case of using such special color ink, a special color ink of a different color may be assigned to each individual or each group. When the printing is carried out by jetting a special color ink on to the recording paper P, it is possible to specify a person who has created the printed matter, by enlarging a portion on to which the special color ink has been jetted. For example, when a case in which a light-color ink has been used is taken into consideration, when a regular printing person has carried out printing by using a special color ink, only ink droplets of the special color ink are adhered to a place of color of the special color ink. Whereas, when the printing is carried out without using the special color ink, for letting this portion to have a color same as the special color ink, since ink droplets of four types of inks namely black, yellow, cyan, and magenta mentioned above are adhered, it is possible to distinguish between the two. Consequently, it is possible to specify a person who has created the printed matter, according to the color of the special color ink.

The functional ink means an ink which contains specific atoms, molecules, and composites etc. which are identifiable. Examples of the functional ink are inks which contain a fluorescent material which emit fluorescence, ink which contain a magnetic material, inks which contain a radio isotope which emits a weak radiation, and inks which contain a stress luminescent particles which emit light when a force is exerted. The DNA ink mentioned above is included in the functional inks. The DNA included in the DNA ink may be a DNA which is extracted from DNA of an individual, or may be a DNA which is composed (synthesized) artificially. As it has been mentioned above, since the functional ink includes specific molecules etc. which are identifiable, by associating in advance identifiable characteristics of the functional ink, and information of a person who creates the printed matter, it is possible to authorize printing in which the functional ink is used only to a specific person, and to specify the person who has created the printed matter.

Moreover, in the embodiment, the pattern data of DNA and the pattern data of fingerprints have been used. However, instead of the pattern data of fingerprints, pattern data of veins of a printing person and a password which has been assigned to each printing person or a group may be used.

Moreover, in the embodiment, the serial numbers and the end flags corresponding to the serial numbers are stored in the data storage section 31, and the end flag corresponding to the serial number of the DNA ink cartridge 42 of which the use has been inhibited is put on. However, an end flag of a serial number of the DNA ink cartridge 42 which can be used may be on. In this case, at step S202 mentioned above, a judgment is made that the DNA ink cartridge 42 which is inserted when the end flag corresponding to the serial number which has been read at step S106 is not on, is a cartridge of which the use has been inhibited.

Or, without using the end flag, a list of serial numbers of the DNA ink cartridges 42 of which the use has been inhibited may be stored in the data storage section 31. In this case, at step S202 mentioned above, when the serial number which has been read at step S106 has matched with any of the serial numbers stored in the data storage section 31, a judgment is made that the DNA ink cartridge 42 which has been inserted is a cartridge of which the use has been inhibited. Moreover, conversely, a list of serial numbers of the DNA ink cartridges 42 which can be used may be stored in the data storage section 31. In this case, at step S202, when the serial number which has been read at step S106 does not match with any of the serial numbers stored in the data storage section 31, a judgment is made that the DNA ink cartridge 42 which has been installed is a cartridge of which the use has been inhibited.

Moreover, in the embodiment, the data storage section 31 serves as both the first memory and the second memory of the present invention, and the serial numbers, the pattern data of DNA, the pattern data of fingerprints, and the end flags are stored upon associating in the data storage section 31. The pattern data of DNA and the pattern data of fingerprints may be stored upon associating in one data storage section, and the serial numbers and the end flags corresponding to the serial numbers may be stored in another data storage section.

Moreover, in the embodiment, when the printing is not carried out by using the DNA ink, the printing is always carried out by using only the image forming ink. However, a structure may be such that when the DNA ink cartridge 42 has not been installed in the cartridge installing section 16*a* (NO at step S103), when the DNA ink cartridge 42 is a cartridge of which the use has been inhibited (YES at step S202), and when the personal authentication could not be done (NO at step S203), a message etc. which inquires (checks) whether or not the printing is to be carried out by using only the image forming ink is displayed. Then, the printing may be carried out by using the image forming ink only when the printing person has selected to carry out printing by using only the image forming ink.

Moreover, in the embodiment, the DNA ink was colorless and transparent. However, the DNA ink may be a color ink, and the DNA ink may be used for forming an image. Moreover, in the embodiment, at the time of carrying out printing by using the DNA ink, the printing was carried out by using both the DNA ink and the image forming ink. However, when the DNA ink is a color ink, the printing may be carried out by using only the DNA ink.

Moreover, in the embodiment, the DNA ink cartridge 42 had the IC tag 42*a*. However, the DNA ink cartridge 42 may have a bar code in which similar data is recorded instead of the IC tag 42*a*.

Figure 16:
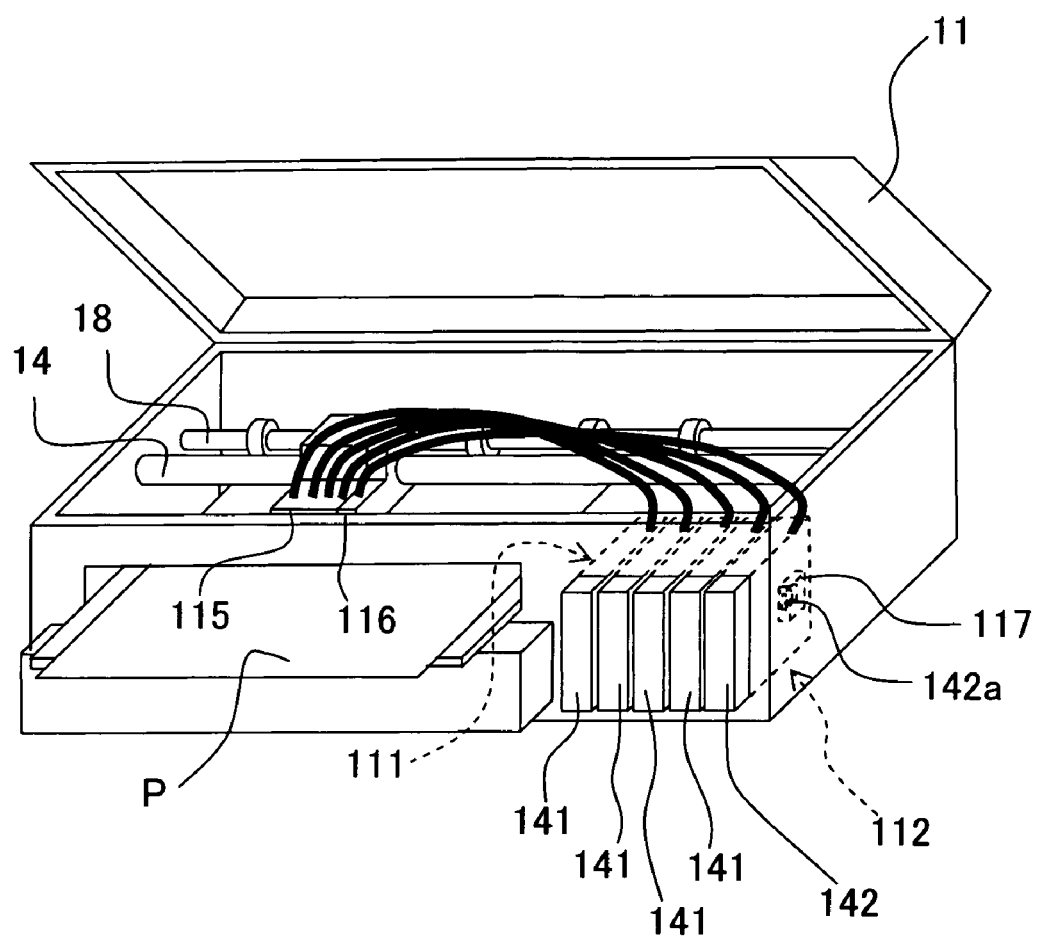
FIG. 16 is a perspective view corresponding to FIG. 3, of a sixth modified embodiment.

Moreover, the cartridge installing section is not restricted to a section which is arranged on the upper surface of the DNA ink head 16 and the image forming head 15, as the cartridge installing sections 15*a* and 16*a* of the present invention. For example, in another modified embodiment (sixth modified embodiment), as shown in FIG. 16, a structure is such that cartridge installing sections 111 and 112 in which an image forming ink cartridge 141 and a DNA ink cartridge 142 are installed, are provided on a front face of a printer 103, and the image forming ink cartridge 141 and an image forming head 115, and the DNA ink cartridge 142 and a DNA ink head 116 are connected via tubes 113. In this case, the DNA ink cartridge 116 is arranged such that a side surface of the DNA ink cartridge is facing an inner surface of a side wall on a right side of the printer 103, and an IC tag 142*a* is attached to this side surface, and an IC tag reader 117 is arranged at a position facing the IC tag 142*a* of the surface of the printer 103, facing the side surface of the DNA ink cartridge 142.

What is claimed is:

1. An image-forming system via which a predetermined printing person causes an image to be formed on a recording medium, the image forming system comprising:
    a cartridge-installation section in which an ink cartridge, filled with an identifiable ink having a predetermined identifiable attribute is installed;
    an ink jetting mechanism which jets, on to the recording medium, the identifiable ink supplied from the ink cartridge installed in the cartridge-installation section;
    a first-information acquiring mechanism which acquires, from the ink cartridge and the identifiable ink, a first information indicating the attribute of the identifiable ink;
    a second-information acquiring mechanism which acquires, from the printing person, a second information specifying the printing person;
    a judging mechanism which compares the first acquired by the first-information acquiring mechanism to the second information acquired by the second-information acquiring mechanism, to judge an allowability of printing to be carried out with the identifiable ink; and
    an inhibiting mechanism which inhibits the ink jetting mechanism from jetting the identifiable ink when the judging mechanism judges not to allow the printing with the identifiable ink.

2. The image-forming system according to claim 1, further comprising:
    a first memory which stores so as to associate mutually corresponding first and second information among the first and the second information;
    wherein the judging mechanism verifies the first information of the identifiable ink acquired by the first-information acquiring mechanism and the first information stored in the first memory, and further verifies the second information acquired by the second-information acquiring mechanism and the second information stored in the first memory, and judges the allowability of the printing to be carried out with the identifiable ink.

3. The image-forming system according to claim 1;
    wherein the first information is assigned to correspond to the second information of the printing person who is indicated by the first information as authorized to carry out the printing with the identifiable ink; and
    wherein the judging mechanism judges that the printing is to be carried out with the identifiable ink only when the first information acquired by the first-information acquiring mechanism corresponds to the second information.

4. The image-forming system according to claim 1;
    wherein the ink cartridge has a first-information retention mechanism which retains the first information corresponding to the identifiable ink filled in the ink cartridge; and
    wherein the first-information acquiring mechanism acquires the first information from the first-information retention mechanism.

5. The image-forming system according to claim 1;
    wherein the first-information acquiring mechanism analyzes the identifiable ink filled in the ink cartridge installed in the cartridge-installation section, to acquire ink identification information.

6. The image-forming system according to claim 1, further comprising:
    a second memory which stores disable information which indicates as to whether or not use of the ink cartridge is inhibited irrespective of the printing person;
    wherein the judging mechanism judges the allowability of the printing to be carried out with the identifiable ink, based on the disable information stored in the second memory.

7. The image-forming system according to claim 6;
    wherein the ink cartridge has a cartridge-ID information retention mechanism which retains a cartridge-ID information assigned uniquely to the ink cartridge;
    wherein the image forming system further comprises:
        a cartridge-ID information acquiring mechanism which acquires the cartridge-ID information from the cartridge-ID information retention mechanism of the ink cartridge installed in the cartridge-installation section;

wherein the disable information stored in the second memory is information indicating the cartridge ID of the ink cartridge which is disabled; and wherein the judging mechanism judges that the printing with the identifiable ink is disabled when the cartridge-ID information acquired by the cartridge-ID information acquiring mechanism matches with the cartridge-ID information which corresponds to the disable information stored in the second memory.

8. The image-forming system according to claim 6;
wherein the ink cartridge has a cartridge-ID information retention mechanism which retains cartridge-ID information which is assigned uniquely to the ink cartridge;
wherein the image forming system further comprises:
   a cartridge-ID information acquiring mechanism which acquires the cartridge-ID information from the cartridge-ID information retention mechanism of the ink cartridge installed in the cartridge-installation section;
wherein the disable information stored in the second memory indicates the cartridge-ID information of the ink cartridge of which use is authorized; and
wherein the judging mechanism judges that the printing with the identifiable ink is enable only when the cartridge-ID information acquired by the cartridge-ID information acquiring mechanism matches with the cartridge-ID information which corresponds to the disable information stored in the second memory.

9. The image-forming system according to claim 6, further comprising:
an ink-shortage detecting mechanism which detects a shortage of the ink in the ink cartridge installed in the cartridge-installation section; and
an updating mechanism which updates the disable information stored in the second memory to information which indicates that use of the ink cartridge, installed in the ink cartridge-installation section, is inhibited irrespective of the printing person when the ink-shortage detecting mechanism detects the shortage of the ink.

10. The image-forming system according to claim 1;
wherein the ink cartridge has a disable information retention mechanism which retains a disable information which indicates use of the ink cartridge is inhibited irrespective of the printing person;
wherein the image forming system further comprises:
   a disable-information acquiring mechanism which acquires the disable information from the disable information retention mechanism of the identifiable ink cartridge installed in the cartridge-installation section; and
wherein the judging mechanism judges the allowability of the printing with the identifiable ink, based on the disable information acquired by the disable-information acquiring mechanism.

11. The image-forming system according to claim 10, further comprising:
an ink-shortage detecting mechanism which detects a shortage of the ink in the ink cartridge installed in the cartridge-installation section; and
an information updating mechanism which updates the disable information retained by the disable-information retention mechanism of the ink cartridge installed in the cartridge-installation section to information which indicates that use of the ink cartridge installed in the ink cartridge-installation section is inhibited irrespective of the printing person, when the ink-shortage detecting mechanism detects the shortage of the ink 12. The image-forming system according to claim 1, further comprising:
another ink jetting mechanism which jets on to a recording medium an image-forming ink to form an image on the recording medium, the image-forming ink being different from the identifiable ink;
wherein upon performing printing with the identifiable ink, the identifiable ink is jetted to a portion of the recording medium by the ink jetting mechanism, and the image-forming ink is jetted to the recording medium by the another ink jetting mechanism.

13. The image-forming system according to claim 12;
wherein the identifiable ink is colorless.

14. The image-forming system according to claim 12;
wherein the identifiable ink is an ink which is selected from a group of inks consisting of a DNA ink, an ink which contains a fluorescent material, an ink which contains a magnetic material, an ink which contains a radioactive isotope, and an ink which contains stress luminescent particles.

15. The image-forming system according to claim 12;
wherein the image-forming ink includes inks of cyan, magenta, yellow, and black inks, and the identifiable ink is a special color ink.

16. The image-forming system according to claim 12;
wherein the image-forming system performs the printing by jetting the ink only from the another ink jetting mechanism when the ink cartridge is not installed in the cartridge-installation section.

17. The image-forming system according to claim 12, further comprising:
a selecting mechanism via which the printing person selects one of an identifiable-ink printing mode of performing printing with the identifiable ink, and a normal printing mode of performing printing with only the image-forming ink;
wherein the image-forming system performs the printing by jetting the identifiable ink from the ink jetting mechanism, and by jetting the image-forming ink from the another ink jetting mechanism, when the judging mechanism judges that printing is to be carried out with the identifiable ink and when the printing person selects the identifiable-ink printing mode via the selecting mechanism; and
wherein the image-forming system performs the printing by jetting the image forming ink only from the another ink jetting mechanism when the printing person selects the normal printing mode via the selecting mechanism.

18. An image-forming apparatus which is communicably connected to a judging device, and via which a predetermined printing person causes an image to be formed on a recording medium, the apparatus comprising:
a cartridge-installation section in which an ink cartridge, filled with an identifiable ink having a predetermined identifiable attribute, is installed;
an ink jetting mechanism which jets, onto the recording medium, the identifiable ink which is supplied from the ink cartridge installed in the cartridge-installation section;
a first-information acquiring mechanism which acquires, from the ink cartridge and the identifiable ink, a first information indicating the attribute of the identifiable ink;
a second-information acquiring mechanism which acquires, from the printing person, a second information specifying a printing person;

a communication mechanism which transmits the second information and the first information to the judging device, and receives a judgment result of an allowability of the printing with the identifiable ink, which is judged based on comparing the second information to the first information by the judging device; and an inhibiting mechanism which inhibits the ink jetting mechanism from jetting the identifiable ink, when the judgment result received by the communication mechanism is a judgment not to allow the printing with the identifiable ink.

19. An image-forming apparatus via which a predetermined printing person causes an image to be formed on a recording medium, comprising:

a cartridge-installation section in which an ink cartridge, filled with an identifiable ink having a predetermined identifiable attribute, is installed;

an ink jetting mechanism which jets, onto the recording medium, the identifiable ink which is supplied from the ink cartridge installed in the cartridge-installation section;

a first-information acquiring mechanism which acquires, from the ink cartridge and the identifiable ink, a first information indicating the attribute of the identifiable ink;

a second-information acquiring mechanism which acquires a second information specifying a printing person;

a judging mechanism which judges an allowability of a printing with the identifiable ink, based on comparing the first information acquired by the first-information acquiring mechanism to the second information acquired by the second-information acquiring mechanism;

an inhibiting mechanism which inhibits the ink jetting mechanism from jetting the identifiable ink when the judging mechanism judges not to allow the printing with the identifiable ink; and a body which accommodates the cartridge-installation section, the ink jetting mechanism, the first-information acquiring mechanism, the second-information acquiring mechanism, the judging mechanism, and the inhibiting mechanism.

20. A non-transitory computer readable media storing a program of operating an image forming-system via which a predetermined printing person causes an image to be formed on a recording medium, the image-forming system having: a cartridge-installation section in which an ink cartridge filled with an identifiable ink having a predetermined identifiable attribute, is installed; an ink jetting mechanism which jets, onto the recording medium, the identifiable ink which is supplied from the ink cartridge installed in the cartridge-installation section; a first-information acquiring mechanism which acquires, from the ink cartridge and the identifiable ink, a first information indicating the attribute of the identifiable ink; and a second-information acquiring mechanism which acquires, from the printing person, second information specifying the printing person;

wherein the computer program is performed by a computer system that comprises one or more processors, a memory operatively coupled to at least one of the processors, and a computer-readable storage medium encoded with instructions by at least one of the processors and operatively coupled to at least one of the processors, the computer program comprising instructions of:

judging an allowability of printing with the identifiable ink, based on comparing the first information acquired by the first-information acquiring mechanism to the second-information acquired by the second-information acquiring mechanism; and inhibiting the ink jetting mechanism from jetting the identifiable ink when a judgment is made not to allow the printing with the identifiable ink.

21. A non-transitory computer readable media storing a program of operating an image-forming apparatus communicably connectable to a judging unit, and via which a predetermined printing person causes an image to be formed on a recording medium, the image-forming apparatus having: a cartridge-installation section in which an ink cartridge, filled with an identifiable ink having a predetermined identifiable attribute, is installed; an ink jetting mechanism which jets, onto the recording medium, the identifiable ink which is supplied from the ink cartridge installed in the cartridge-installation section; a first-information acquiring mechanism which acquires, from the ink cartridge and the identifiable ink, a first information indicating the attribute of the identifiable ink; and a second-information acquiring mechanism which acquires a second information specifying the printing person;

wherein the computer program is performed by a computer system that comprises one or more processors, a memory operatively coupled to at least one of the processors, and a computer-readable storage medium encoded with instructions by at least one of the processors and operatively coupled to at least one of the processors, the computer program comprising instructions of:

transmitting, to the judging unit, the first information acquired by the first-information acquiring mechanism and the second information acquired by the second-information acquiring mechanism;

receiving a judgment result of the judgment of an allowability of a printing with the identifiable ink, based on comparing the information specifying the printing person to the first information; and inhibiting the ink jetting mechanism from jetting the identifiable ink when the judgment result is made not to allow the printing with the identifiable ink.

22. A non-transitory computer readable media storing a program of operating an image-forming apparatus via which a predetermined printing person causes an image to be formed on a recording medium, the image forming apparatus having: a cartridge-installation section in which an ink cartridge, filled with an identifiable ink having a predetermined identifiable attribute, is installed; an ink jetting mechanism which jets, onto the recording medium, the identifiable ink supplied from the ink cartridge installed in the cartridge-installation section; a first-information acquiring mechanism which acquires, from the ink cartridge section and the identifiable ink, a first information indicating the attribute of the identifiable ink; and a second-information acquiring mechanism which acquires second information specifying the printing person;

wherein the computer program is performed by a computer system that comprises one or more processors, a memory operatively coupled to at least one of the processors, and a computer-readable storage medium encoded with instructions by at least one of the processors and operatively coupled to at least one of the processors, the computer program comprising instructions of:

judging an allowability of a printing with the identifiable ink, based on comparing the first information acquired by the first-information acquiring mechanism to the second information acquired by the second-information acquiring mechanism; and inhibiting the ink jetting mechanism from jetting the identifiable ink when a judgment is made not to allow the printing with the identifiable ink.

23. An image-forming method via which a predetermined printing person causes an image to be formed on a recording medium, comprising:

providing an ink cartridge in which an identifiable ink having a predetermined attribute is filled;

acquiring, from the ink cartridge and the identifiable ink, information indicating the attribute of the identifiable ink;

acquiring, from the printing person, information which specifies the printing person;

comparing the information indicating the attribute of the identifiable ink to the information indicating the printing person to authenticate the printing person; and inhibiting the ink jetting mechanism from jetting the identifiable ink when a judgment is made not to allow the printing with the identifiable ink when the printing person is not authenticated or allowing the ink jetting mechanism to jet the identifiable ink only when the printing person is authenticated.

24. The image-forming method according to claim 23;

wherein the verification of the information indicating the attribute of the identifiable ink and the information indicating the printing person is performed based on a table correlating the information.

* * * * *